US011216307B1

United States Patent
Verplaetse

(10) Patent No.: US 11,216,307 B1
(45) Date of Patent: *Jan. 4, 2022

(54) SCHEDULER FOR VECTOR PROCESSING OPERATOR READINESS

(71) Applicant: Ambarella International LP, Santa Clara, CA (US)

(72) Inventor: Peter Verplaetse, Redwood City, CA (US)

(73) Assignee: Chris Maiorana, Santa Clara, CA (US)

( * ) Notice: Subject to any disclaimer, the term of this patent is extended or adjusted under 35 U.S.C. 154(b) by 232 days.

This patent is subject to a terminal disclaimer.

(21) Appl. No.: 16/668,157

(22) Filed: Oct. 30, 2019

Related U.S. Application Data

(63) Continuation of application No. 15/581,341, filed on Apr. 28, 2017, now Pat. No. 10,503,552.

(51) Int. Cl.
*G06F 9/46* (2006.01)
*G06F 9/50* (2006.01)
*G06F 9/48* (2006.01)
*G06T 1/20* (2006.01)

(52) U.S. Cl.
CPC .......... *G06F 9/5011* (2013.01); *G06F 9/4881* (2013.01); *G06T 1/20* (2013.01)

(58) Field of Classification Search
CPC .............................. G06F 9/5011; G06F 9/4881
See application file for complete search history.

(56) References Cited

U.S. PATENT DOCUMENTS

| | | | |
|---|---|---|---|
| 6,879,341 B1 * | 4/2005 | Silverbrook | B41J 2/14314 348/207.99 |
| 2004/0003220 A1 * | 1/2004 | May | G06F 8/445 712/245 |
| 2014/0115195 A1 | 4/2014 | Higham | 710/22 |

* cited by examiner

*Primary Examiner* — Wissam Rashid
(74) *Attorney, Agent, or Firm* — Christopher P. Maiorana, PC

(57) ABSTRACT

An apparatus includes a processor and an operator readiness circuit. The processor may be configured to schedule one or more operators used to process a plurality of vectors based on one or more status signals indicating a readiness state of the one or more operators. The operator readiness circuit may be configured to (i) compare a target position and an actual position of each operand associated with the one or more operators to determine a readiness state of each operand, (ii) update the readiness state of the operands using a plurality of state machines, and (iii) generate the one or more status signals indicating the readiness state of the one or more operators based on the readiness state of each operand associated with the one or more operators.

18 Claims, 10 Drawing Sheets

SCHEDULER FOR VECTOR PROCESSING OPERATOR READINESS

This application relates to U.S. Ser. No. 15/581,341, filed Apr. 28, 2017, which is incorporated by reference in its entirety.

FIELD OF THE INVENTION

The invention relates to vector processing generally and, more particularly, to a method and/or apparatus for implementing a scheduler for vector processing operator readiness.

BACKGROUND

A vector processor executes operators that work on vectors that are multidimensional arrays of elements. The elements can range from single bits to multi-bit numerical values, such as bytes, integer words or floating point numbers. Because the vectors can be large, the execution of a single operator can take many cycles of the vector processor. Execution of the operators in a strict sequential fashion is neither efficient nor practical. Inefficiencies exist because a strict sequential execution would lose the benefit of parallelism and partial execution by starting downstream operators when only parts of upstream operators have completed. Storing full vectors as intermediate results between operators is also impractical due to the large amounts of intermediate storage that would be consumed.

It would be desirable to implement a scheduler for vector processing operator readiness.

SUMMARY

The invention concerns an apparatus including a processor and an operator readiness circuit. The processor may be configured to schedule one or more operators used to process a plurality of vectors based on one or more status signals indicating a readiness state of the one or more operators. The operator readiness circuit may be configured to (i) compare a target position and an actual position of each operand associated with the one or more operators to determine a readiness state of each operand, (ii) update the readiness state of the operands using a plurality of state machines, and (iii) generate the one or more status signals indicating the readiness state of the one or more operators based on the readiness state of each operand associated with the one or more operators.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing a scheduler for vector processing operator readiness that may (i) determine a readiness of each operator, (ii) determine an allocation of each operator, (iii) track a readiness of all operands, (iv) track a readiness of all operators, (v) allocate operators to hardware resources without preemption, (vi) allocate operators to hardware resources with preemption and/or (vii) be implemented as one or more integrated circuits.

Embodiments of the invention generally provide a scheduler circuit for a streaming vector processor. The scheduler circuit may allocate operators among multiple hardware resources that process the operators. The scheduler circuit generally comprises multiple parts, including a hardware block (or circuit) that determines operator readiness and a hardware block (or circuit) that allocates ready operators to available resources.

The scheduler circuit generally tracks both target positions for all operands (or vectors) and actual positions of all operands to determine operator (or task) readiness. In various embodiments, the positions may be absolute positions and/or relative positions. A target position may correspond to a buffer location established in a shared memory where an operand may be buffered. The target positions may be reported by the hardware resources. An actual position may correspond to a current location of an operand within the hardware resources. The actual positions may be reported as the hardware resources produce operator output data in a streaming fashion. Each operand may be determined as ready when the actual position of an operand meets or exceeds the target position of that operand. Each operator may be determined as ready when all corresponding operands are ready.

Each hardware resource (or hardware engine) generally reports status information to the scheduler circuit. Each status report may indicate if a hardware resource is idle or near idle. The scheduler circuit may allocate a ready operator to a compatible idle resource. If multiple operators are ready and compatible with the same idle hardware resource, the scheduler circuit generally selects the ready operator based on priority (or urgency). In cases of a tie where multiple ready operators have the same priority, the scheduler circuit may arbitrate among the ready operators in a round-robin fashion or a least-recently used fashion. Other arbitration methods may be implemented to meet the design criteria of a particular application. In some embodiments, the scheduler circuit may support preemption of low-priority operators already running in favor of higher-priority unscheduled operators.

Figure 1:
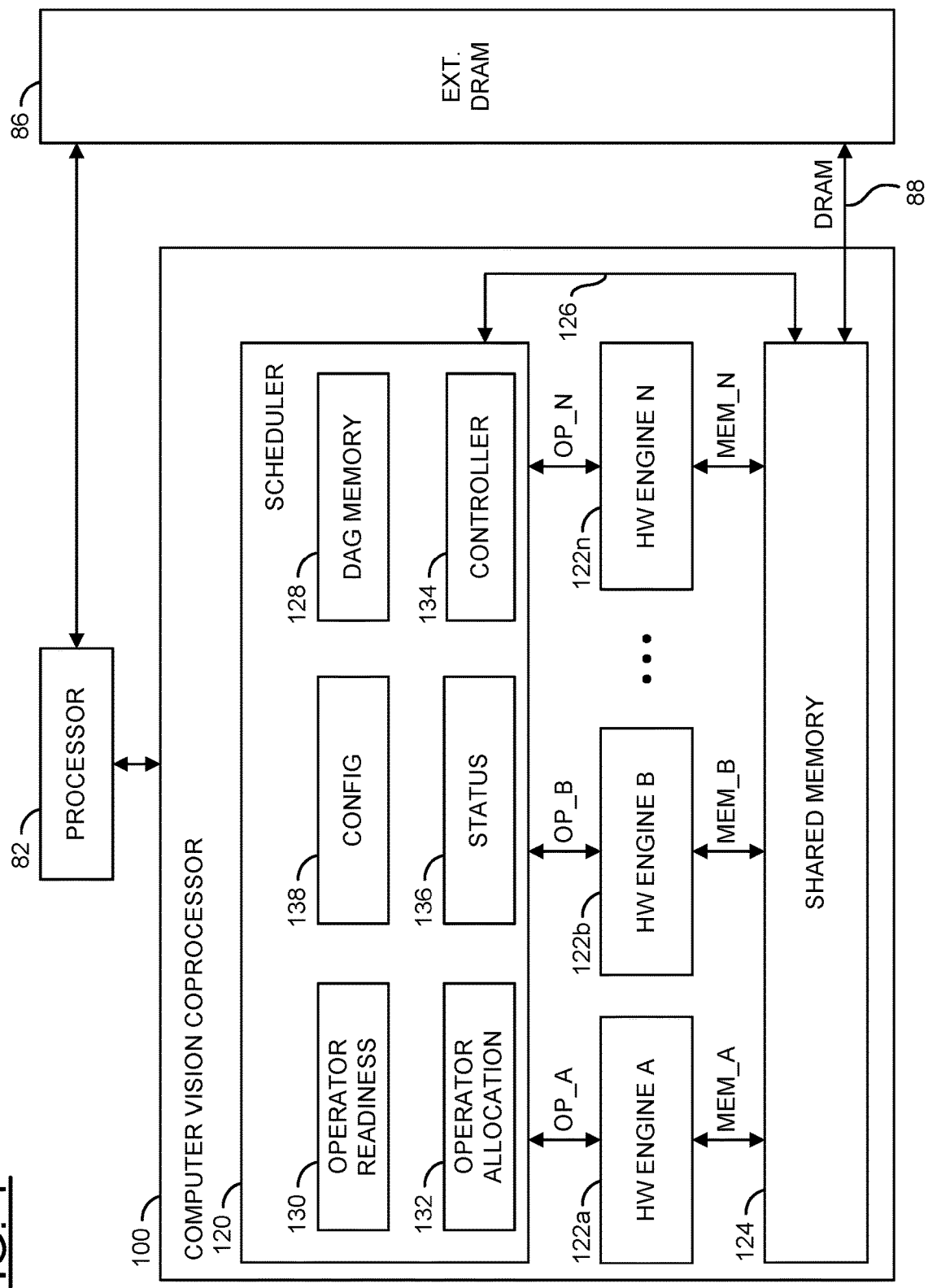
FIG. 1 is a diagram of a system.

Referring to FIG. 1, a diagram of a system 80 is shown illustrating a context in which one or more vector processing operations may be implemented in accordance with an example embodiment of the invention. The system (or apparatus) 80 may be implemented as part of a computer vision system. In various embodiments, the system 80 may be implemented as part of a camera, a computer, a server (e.g., a cloud server), a smart phone (e.g., a cellular telephone), a personal digital assistant, or the like.

In an example embodiment, the system 80 generally comprises a block (or circuit) 82, a block (or circuit) 86, a memory bus 88 and a block (or circuit) 100. The circuit 100 generally comprises a block (or circuit) 120, one or more blocks (or circuits) 122a-122n, a block (or circuit) 124 and a path 126. The circuit 120 may include a block (or circuit) 128, a block (or circuit) 130, a block (or circuit) 132, a block (or circuit) 134, a block (or circuit) 136 and a block (or circuit) 138.

Multiple signals (e.g., OP_A to OP_N) may be exchanged between the circuit 120 and the respective circuits 122a-122n. Each signal OP_A to OP_N may convey processing operation information and/or yield operation information. Multiple signals (e.g., MEM_A to MEM_N) may be exchanged between the respective circuits 122a-122n and the circuit 124. The signals MEM_A to MEM_N may carry data. A signal (e.g., DRAM) may be exchanged between the circuit 86 and the circuit 124. The signal DRAM may transfer data between the circuits 86 and 124.

The circuit 82 may implement a processor circuit. In some embodiments, the processor circuit 82 may be a general purpose processor circuit. The processor circuit 82 may be operational to interact with the circuit 100 and the circuit 86 to perform various vector processing tasks.

The circuit 100 may implement a coprocessor circuit. The coprocessor circuit 100 is generally operational to perform specific vector processing tasks as arranged by the processor circuit 82. The coprocessor circuit 100 may be separate from the processor circuit 82 and generally assists the processor circuit 82 to perform the various vector processing tasks. In various embodiments, the coprocessor circuit 100 may operate as a directed acyclic graph vector processor implemented solely in hardware. The coprocessor circuit 100 may directly perform a data flow directed acyclic graph generated by software that specifies vector processing (e.g., computer vision processing) tasks. The directed acyclic graph generally contains descriptors that specify input/output buffers in the circuit 86 and/or the circuit 124, computation nodes that perform vector processing computations, called operators (or tasks), and the dependencies between data buffers and the operators (e.g., links in the graphs).

The circuit 86 may implement a dynamic random access memory (DRAM) circuit. The DRAM circuit 86 is generally operational to store multidimensional arrays of input data elements and various forms of output data elements. The DRAM circuit 86 may exchange the input data elements and the output data elements with the processor circuit 82 and the coprocessor circuit 100.

The circuit 120 may implement a scheduler circuit. The scheduler circuit 120 is generally operational to schedule tasks among the circuits 122a-122n to perform a variety of computer vision tasks as defined by the processor circuit 82. Individual tasks may be allocated by the scheduler circuit 120 to the circuits 122a-122n. The scheduler circuit 120 may time multiplex the tasks to the circuits 122a-122n based on the availability of the circuits 122a-122n to perform the work.

Each circuit 122a-122n may implement a processing resource (or hardware resource or hardware engine). The hardware engines 122a-122n are generally operational to perform specific processing tasks. In some configurations, the hardware engines 122a-122n may operate in parallel and independent of each other. In other configurations, the hardware engines 122a-122n may operate collectively among each other to perform allocated tasks. The hardware engines 122a-122n may be homogenous processing resources (all circuits 122a-122n may have the same capabilities) or heterogeneous processing resources (two or more circuits 122a-122n may have different capabilities). The operators performed by the hardware engines 122a-122n may include, but are not limited to, a warping operator, component operators that manipulate lists of components (e.g., components may be regions of a vector that share a common attribute and may be grouped together with a bounding box), a matrix inverse operator, a dot product operator, a convolution operator, conditional operators (e.g., multiplex and demultiplex), a remapping operator, a minimum-maximum-reduction operator, a pooling operator, a non-minimum operator, non-maximum suppression operator, a gather operator, a scatter operator, a statistics operator, a classifier operator, an integral image operator, an upsample operator and a sums of horizontally overlapping sliding windows operator. In various embodiments, the hardware engines 122a-122n may be implemented solely as hardware circuits. Additional details of hardware engine implementations may be found in co-pending U.S. application Ser. No. 15/291,273 filed Oct. 12, 2016, Ser. No. 15/372,995 filed Dec. 8, 2016, Ser. No. 15/403,540 filed Jan. 11, 2017, Ser. No. 15/405,456 filed Jan. 13, 2017, and Ser. No. 15/444,641 filed Feb. 18, 2017, each of which are hereby incorporated by reference in their entirety.

The circuit 124 may implement a shared memory circuit. The shared memory 124 is generally operational to store all of or portions of the multidimensional arrays (or vectors) of input data elements and output data elements generated by the hardware engines 122a-122n. The input data elements may be received from the DRAM circuit 86 via the memory bus 88. The output data elements may be sent to the DRAM circuit 86 via the memory bus 88.

The path 126 may implement a transfer path internal to the coprocessor circuit 100. The transfer path 126 is generally operational to move data from the scheduler circuit 120 to the shared memory 124. The transfer path 126 may also be operational to move data from the shared memory 124 to the scheduler circuit 120.

The circuit 128 may implement a local directed acyclic graph (DAG) memory. The DAG memory 128 may be operational to store one or more binary representations of one or more directed acyclic graphs used by the scheduler circuit 120. The directed acyclic graph representations may be compiled external to the system 80 and loaded into the DAG memory 128 through the shared memory 124.

The circuit 130 may implement an operator readiness circuit. The operator readiness circuit 130 is generally operational to determine when operators are ready for processing in the hardware engines 122a-122n. An operator is generally ready for processing when all operands (e.g., input vectors) corresponding to that operator are ready.

The circuit 132 may implement an operator allocation circuit. The operator allocation circuit 132 may be operational to allocate the operators and corresponding operands among one or more hardware engines 122a-122n for processing. The allocation may be based on availability of the hardware engines 122a-122n, the readiness of the operators and the operands, and a priority of the operands.

The circuit 134 may implement a controller circuit. The controller circuit 134 may receive a directed acyclic graph either directly from the processor circuit 82, indirectly from the DRAM circuit 86 or from the shared memory 124. The directed acyclic graph may be stored in the DAG memory 128. Upon receipt of a run command from the processor circuit 82, the controller circuit 134 may parse the directed acyclic graph into one or more data flows. Each data flow may include one or more operators. Once the directed acyclic graph is parsed, the controller circuit 134 may allocate the data flows/operators to the hardware engines 122a-122n and send the relevant operator configuration information to start the operators.

The circuit 136 may implement a status circuit (or registers). The status registers 136 is generally operational to store status of the hardware engines 122a-122n, the processing of the operators, and the status of the operands. The status data may be exchanged with the controller circuit 134.

The circuit 138 may implement a configuration circuit (or registers). The configuration registers 138 are generally operational to store configuration data of the hardware engines 122a-122n. The configuration data may be exchanged with the controller circuit 134.

Each directed acyclic graph binary representation may be an ordered traversal of a directed acyclic graph with descriptors and operators interleaved based on data dependencies. The descriptors generally provide registers that link data buffers to specific operands in dependent operators. In various embodiments, an operator may not appear in the directed acyclic graph representation until all dependent descriptors are declared for the operands. In some embodiments, multiple (e.g., two) separate tables may be employed, a table of all operators and another table of all descriptors linked together with explicit registers.

The directed acyclic graph vector processing performed by the coprocessor circuit 100 generally supports the general-purpose host processing in the processor circuit 82 where the processor circuit 82 may execute traditional reduced instruction set computing (RISC)-based instructions. Software running on the processor circuit 82 may be the controlling task. Prior to run time, a directed acyclic graph compiler may prepare one or more binary representations of one or more directed acyclic graphs composed of operators, the location of primary input/output data structures in DRAM circuit 86, and the links between operators through the shared memory 124. The directed acyclic graph binary representations may be loaded into the DAG memory 128.

As the processor circuit 82 executes a coprocessor instruction, the instruction may be placed into a queue of the coprocessor circuit 100. Software running on the processor circuit 82 may command performance of the directed acyclic graph in the coprocessor circuit 100 by executing a "run" coprocessor instruction. The coprocessor circuit 100 may respond to the coprocessor instructions from the queues, one at a time. Either during execution or upon completion of the directed acyclic graph, the coprocessor circuit 100 may store the results in the DRAM circuit 86 and signal the processor circuit 82 that the coprocessor instruction is finished. Additional details for the architecture of the system 80 may be found in co-pending U.S. application Ser. No. 15/459,284 file Mar. 15, 2017, which is hereby incorporated by reference in its entirety.

The hardware engines 122a-122n may process the operators in chunks (or pieces). A chunk may mean that a part of the whole operator result is produced. The hardware engines 122a-122n may determine the chunk boundaries dynamically based on the operand availability, and may be guided by the scheduler configuration (for example, in a case of preemption). The hardware engines 122a-122n may read the input vectors from dedicated buffers allocated in the memory (e.g., the shared memory 124 and/or the DRAM memory 86), perform internal processing, and write the output vectors to dedicated buffers allocated in the memory. The input vectors are generally read only when available. The output vector may be written only when free space is available in the buffers. When insufficient input vector data is available to read, or insufficient buffer space is available to write the output vectors, an operator may be (at least temporarily) considered starved.

The hardware engines 122a-122n may have double-banked configuration registers and thus may receive configuration and status information for the next operator chunk while busy processing the current operator chunk. The hardware engines 122a-122n may report busy level information (e.g., busy_level) back to the scheduler circuit 120 to indicate whether a new operator may or should be accepted. The busy level information may include an idle status (e.g., a busy_level 0), a starved status (e.g., a busy_level 1), a busy status (e.g., a busy_level 2) and a full status (e.g., a busy_level 3). The idle status may indicate that no operator is scheduled, or the current operator is close to completion. Preemption may be desired. The starved status may indicate that the current operator is starved of at least one corresponding operand. Preemption may be recommended. The busy status may indicate that the current operator is being executed. Preemption is generally allowed but not recommended. The full status may indicate that both a current and next operator is scheduled. Preemption may not be allowed.

When a hardware engine 122a-122n unschedules an operator, that hardware engine 122a-122n may send back results to the scheduler circuit 120. The results may include information relevant to the scheduler circuit 120 (e.g., operator done flag, status flags—such as error and overflow flags, input operand disconnect directives, output operand done flags and/or operand next target information). The results may include operator status that may be interpreted by the hardware engines 122a-122n when the operator is rescheduled (e.g., in a case where the operator is not finished when unscheduled). The operator status may be stored in the local status registers 136. The hardware engine 122a-122n configuration at the time of the unscheduling may be stored in the local configuration registers 138. Later, when a partially processed operator is rescheduled, both the relevant operator configuration data stored in the configuration registers 138 and the recorded operator status from status registers 136 may be sent to the appropriate hardware engine 122a-122n.

A hardware engine 122a-122n may unschedule an incomplete operator because the hardware engine 122a-122n becomes starved of one or more operands that correspond to the incomplete operator. For the starved operands, the hardware engine 122a-122n may specify in the results a next target position. The next target position may be the position (e.g., the absolute position or the relative position) that should be available to read input operands (or input vectors), or free to write output operands (or output vectors), before the incomplete operator should be considered for rescheduling.

The scheduler circuit 120 generally tracks the target positions and the actual positions for all operands. Based on the tracking, the scheduler circuit 120 may determine the operators that are ready (e.g., eligible for scheduling). The scheduler circuit 120 may also monitor the busy levels of the hardware engines 122a-122n to know which hardware engines 122a-122n are able to process ready operators. Based on priority groups, the scheduler circuit 120 generally decides when to allocate the ready operators to the hardware engines 122a-122n.

Figure 2:
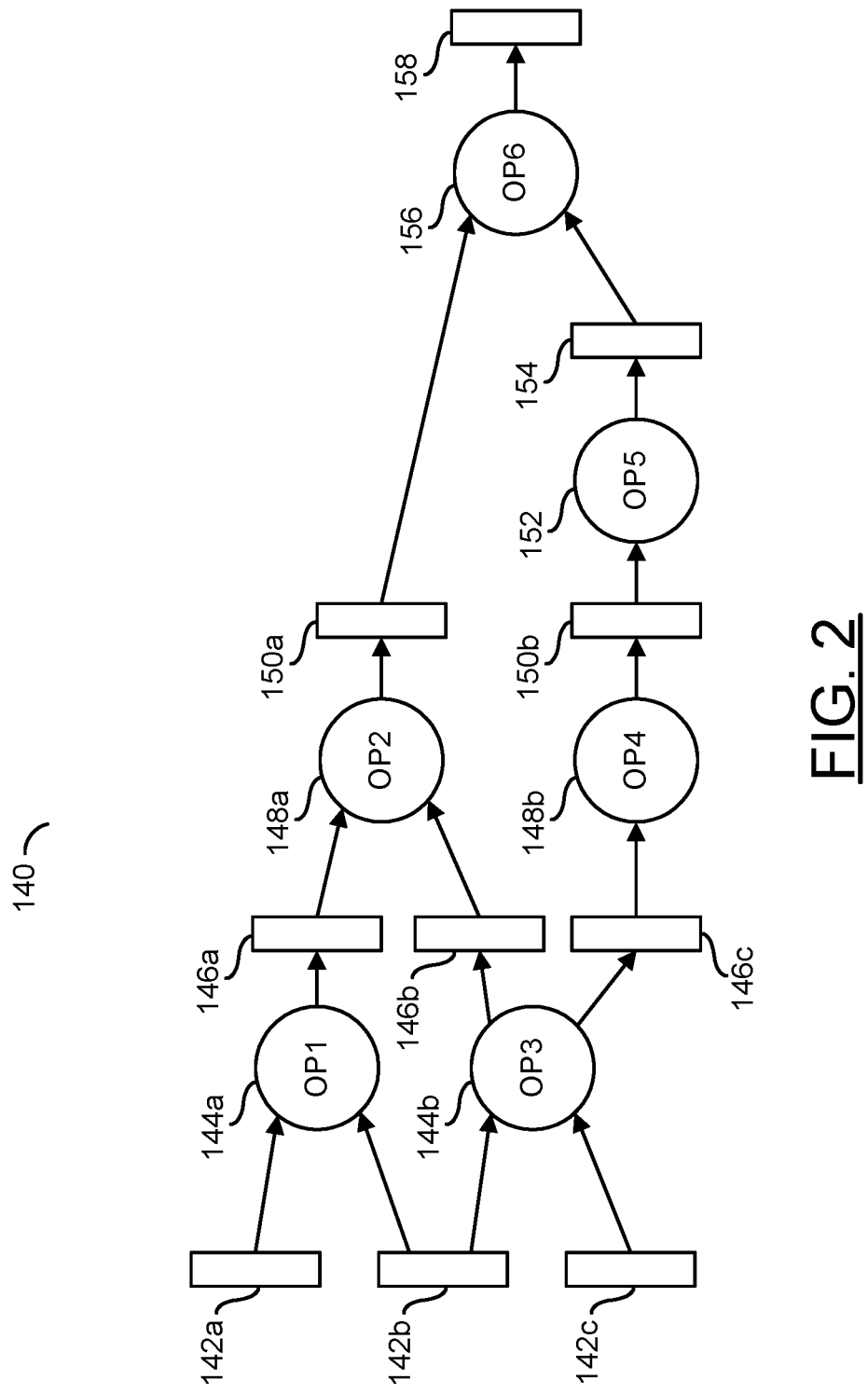
FIG. 2 is a diagram of a portion of a directed acyclic graph.

Referring to FIG. 2, a diagram of an example implementation of a portion of a directed acyclic graph 140 is shown. The directed acyclic graph 140 generally comprises one or more operators (or tasks) 144a-144b in an initial stage, one or more operators (or tasks) 148a-148b in a subsequent stage, one or more operators (or tasks) 150a-150b in another stage, an operator (or tasks) 152 and an operator (or tasks) 156 in a final stage. The operators may be related by a plurality of links (or connections) that connect the operators to one or more initial vectors 142a-142c, one or more intermediate vectors 146a-146c, one or more vectors 150a-150b, a vector 154 and a final vector 158. In some embodiments, multiple final vectors (or primary output vectors) may be generated. Each operator may be processed in one or more of the hardware engines 122a-122n. In various embodiments, multiple operators may be processed in one or more of the hardware engines 122a-122n.

To avoid large storage consumption in the shared memory 124, the output vectors may be generated in a streaming fashion, and the operators may be processed in chunks. The streaming order is generally a predetermined linear order of all elements of a vector. In some embodiments, the order may be a raster scan order in a specific order of dimensions. In other embodiments, the order may be a tiled scan where typically smaller one-dimensional or two-dimensional rectangular areas (e.g., tiles) may be streamed in raster scan order within the tile, but in a potentially different order of dimensions across tiles.

In the example illustrated, locations in the shared memory 124 of multiple initial vectors 142a-142c may be specified by the scheduler circuit 120. The scheduler circuit 120 may choose a hardware engine 122a-122n that is capable of processing the operator 144a and is available to process the input vectors 142a and 142b. Likewise, the scheduler circuit 120 may choose a hardware engine 122a-122n that is capable of processing the operator 144b and is available to process the input vectors 142b and 142c. In various embodiments, the operators 144a and 144b may be allocated to different hardware engines 122a-122n and subsequently processed in parallel. In other embodiments, the operators 144a and 144b may be processed sequentially by one or more of the hardware engines 122a-122n.

Output vectors 146a-146c created by the operators 144a and 144b may be buffered in the shared memory 124. The scheduler circuit 120 may select the same, or another hardware engine 122a-122n to process the operator 148a using the output vectors 146a and 146b generated by the operators 144a and 144b as input vectors. The operator 148a may generate another output vector 150a that is buffered in the shared memory 124.

The operator 148b may be processed by the same, or a different hardware engine 122a-122n as the operators 144a and/or 144b. An input vector for the operator 148b may be the output vector 146c buffered in the shared memory 124 from the operator 144b. The operator 148b may generate an additional output vector 150b that is buffered in the shared memory 124.

The operator 152 may be processed by the same, or a different hardware engine 122a-122n as the operators 144a, 144b, 148a and/or 148b. An input vector for the operator 152 may be the output vector 150b buffered in the shared memory 124. The operator 152 may store an output vector 154 in the shared memory 124.

The operator 156 may be processed by the same, or a different hardware engine 122a-122n as the operators 144a, 144b, 148a, 148b and/or 154. One or more input vectors for the operator 156 may be the output vectors 150a and 154 buffered in the shared memory 124. The operator 156 may store one or more output vectors 158 in the shared memory. Other variations and sizes of directed acyclic graphs may be implemented to meet the design criteria of a particular application.

Figure 3:
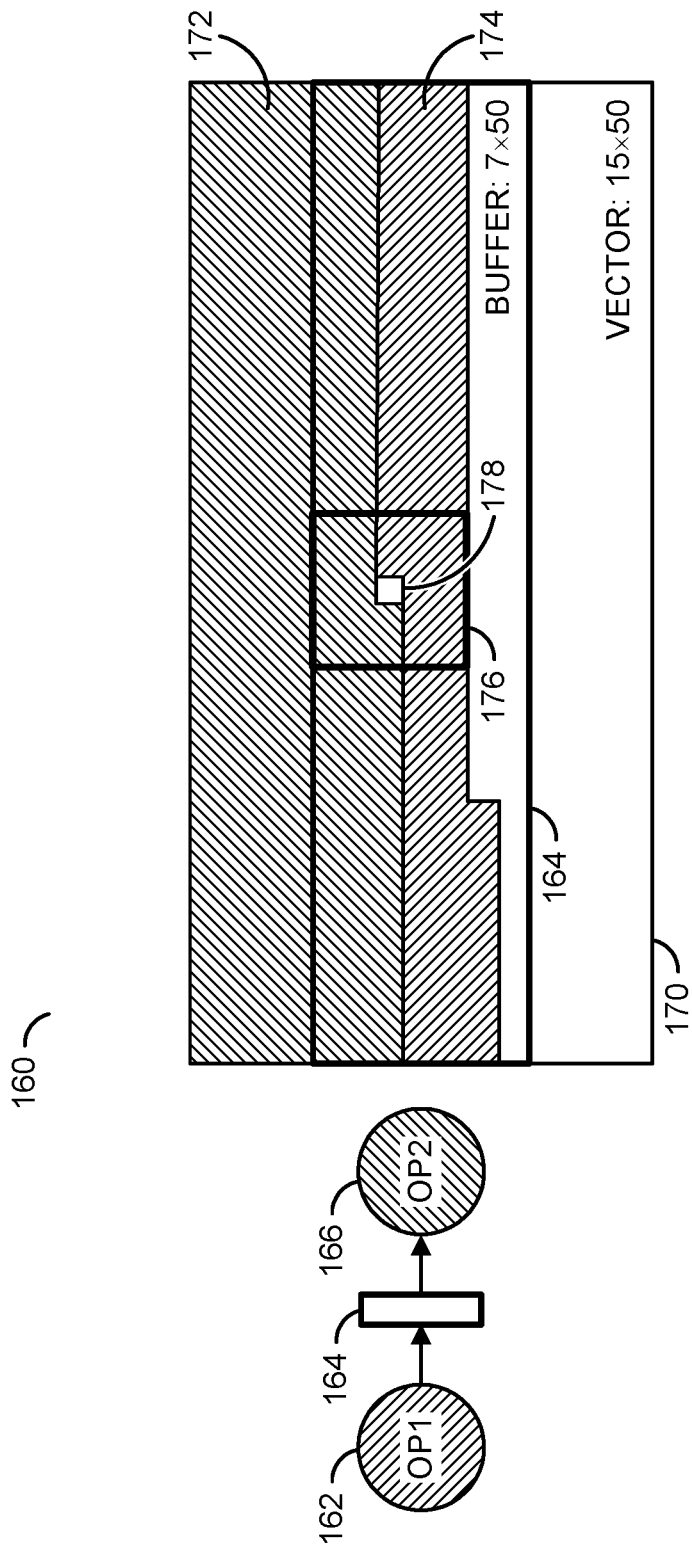
FIG. 3 is a diagram of a partial vector buffer.

Referring to FIG. 3, a diagram 160 of an example partial vector buffer is shown. The example generally illustrates a partial height vector buffer. In various embodiments, one or more dimensions (e.g., width, height or any higher dimension) of the buffer may be a partial dimension. In the example, an operator (or function) 162 may produce a vector 170 in raster scan order. The vector 170 may be stored in a partial vector buffer 164. Another operator (or function) 166 may perform a filter task in raster scan order with an N×N (e.g., 5×5) filter area 176 around a central location 178 being filtered. The operator 166 may consume the vector 170 from the partial vector buffer 164.

The vector 170 in the example may be a two-dimensional vector. The vector 170 generally has a height (e.g., VH) and a width (e.g., VW). The partial vector buffer 164 generally has a height (e.g., BH) and a width (e.g., BW). The buffer height BH (e.g., BH=7) may be smaller than the vector height (e.g., BH<VH) and greater than the height N of the filter area 176 (e.g., BH>N). The buffer width BW (e.g., BW=50) may match the width of the vector 170 (e.g., BW=VW) and is greater than the width N of the filter area 176 (e.g., BW>N). The partial vector buffer 164 is generally unable to hold the entire input vector 170 all at the same time since the buffer height BH is less than the vector height VH (e.g., BH<VH).

The operands corresponding to the operators are generally processed by one or more of the hardware engines 122a-122n. The hardware engines 122a-122n may consume all or part of the operator input vectors (e.g., input operands) and produce all or part of the operator output vectors (e.g., output operands). In various embodiments, not all hardware engines 122a-122n may process all possible operators. The coprocessor circuit 100 typically has multiple (e.g., M) different types of hardware engines 122a-122n that each may process a disjoint and/or overlapping subset of all operators. In some embodiments, the coprocessor circuit 100 may have multiple hardware resources of the same type. As such, the hardware engines 122a-122n in the coprocessor circuit 100 may be homogenous, heterogeneous or any mix thereof.

The hardware engines 122a-122n generally produce output vectors in a predetermined order (e.g., the streaming order) into full vector buffers and/or partial vector buffers, or in a random order in the full vector buffers. Different streaming orders may be used for different output operands. The streaming order may be optimized to maximize an efficiency of the hardware engines 122a-122n that produces the output vectors. The streaming order may also be optimized to minimize the partial buffer criteria within the directed acyclic graph.

The hardware engines 122a-122n may consume the input vectors either in a strict streaming order, or in a random access order over a subset of the input vector elements. For example, the subset may be several (e.g., K) rows of vector elements at a time. The subsets generally moves along the input vectors in the same order that the input vectors are produced.

In the example illustrated in FIG. 3, an initial subset 172 of less than all elements of the input vector 170 may be produced by the operator 162 and streamed into the partial vector buffer 164 (e.g., starting from the upper left and continuing in the raster scan order, left-to-right and top-to-bottom as illustrated). Once the subset 172 within the partial vector buffer 164 has a sufficient number of elements of the input vector 170 (e.g., enough elements to fill the N×N filter area 176), processing of the operator 166 may begin. As more elements of the subset 172 are generated and stored in the partial vector buffer 164, the earlier elements already consumed (e.g., illustrated above the buffer 164) may be overwritten and/or removed.

A subsequent subset 174 of less than all elements in the input vector 170 may be produced by the operator 162 and streamed in the partial vector buffer 164 as the elements in the subset 172 continue to be consumed. As long as the N×N filter area 176 has elements to process, the operator 166 may perform the filter task even though the partial vector buffer 164 is not completely filled. In some situations, a subset of the input vector 170 may potentially be the full input vector 170, in which case a full vector buffer may be used for to hold the entire input vector 170 all at once.

A primary input vector to a directed acyclic graph may be a full vector that is preloaded into a full vector buffer, or may be streamed into a partial vector buffer from a source (such as the DRAM circuit 86). A primary output of a directed acyclic graph may be stored in a full vector buffer, or may be streamed in a partial size buffer that automatically writes to a different final destination (such as the DRAM circuit 86).

The efficient processing of the operators of a directed acyclic graph in streaming fashion using a limited set of hardware resources specifies that the scheduler circuit 120 may instruct the hardware engines 122a-122n to start, suspend and/or later resume processing of specific operators on specific hardware resources. The scheduler circuit 82 generally considers buffer fullness of the operands (both the input operands and the output operands) and priority directives to maximize an efficiency of overall directed acyclic graph processing.

To determine operator readiness, the scheduler circuit 120 may track the target positions and the actual positions for all operands. An operand may be considered ready when the actual position meets or exceeds the target position. An operator may be considered ready when all corresponding operands are ready.

The positions may be maintained in absolute coordinates in a multidimensional vector space, or in relative measures (e.g., the number of elements in a streaming order). Separate flags may be utilized to indicate if a vector position corresponds to an origin position (e.g., an empty vector) or an end-of-vector (e.g., EOV) position (e.g., a full vector).

An absolute position may be a property of the buffer to which the operand connects. For input operands, the absolute position generally corresponds to a last written coordinate. For output operands, the absolute position may correspond to a last free coordinate that may be written.

A relative position is generally a property of the operands accessing a buffer. For input operands, the relative position may correspond to the number of elements written that have not yet been consumed by the operator. For output operands, the relative position may correspond to the number of elements that may have been written.

For output operands, the actual position may be initialized to the buffer size (e.g., the end-of-vector position for a full vector buffer, or a smaller position for a partial vector buffer). For input operands, the actual position may be initialized to the end-of-vector position that was pre-initialized in the shared memory 124, or to the origin position for internal buffers and primary input operands that are streamed in at runtime. The actual positions of all buffers (absolute) and operands (relative) may be adjusted continuously as data gets produced and consumed by the hardware engines 122a-122n.

To simplify the implementation, the scheduler circuit 120 may not know anything about the vector access pattern of the operators. The hardware engines 122a-122n generally know the vector access pattern, and may provide well-chosen next targets for operands at the time an incomplete operator (e.g., operator done flag=incomplete or zero) is unscheduled. For the initial target positions, the scheduler circuit 120 may either use a value provided via operator configuration information stored in the configuration registers 128, or use a conservative guess, such as a single element for input operands, and zero elements for output operands. The small guess may guarantee that all output operands may be initially ready and the input operands in pre-initialized primary input buffers may be ready, while other input operands may not be ready.

A blocking input operand may be realized by setting the initial target position to the end-of-vector position. An operator with a blocking input operand may only be considered ready, and thus may only be scheduled, once a complete vector is available for the input operand. Thus, the input buffer to the blocking input operator may be a full vector buffer.

Figure 4:
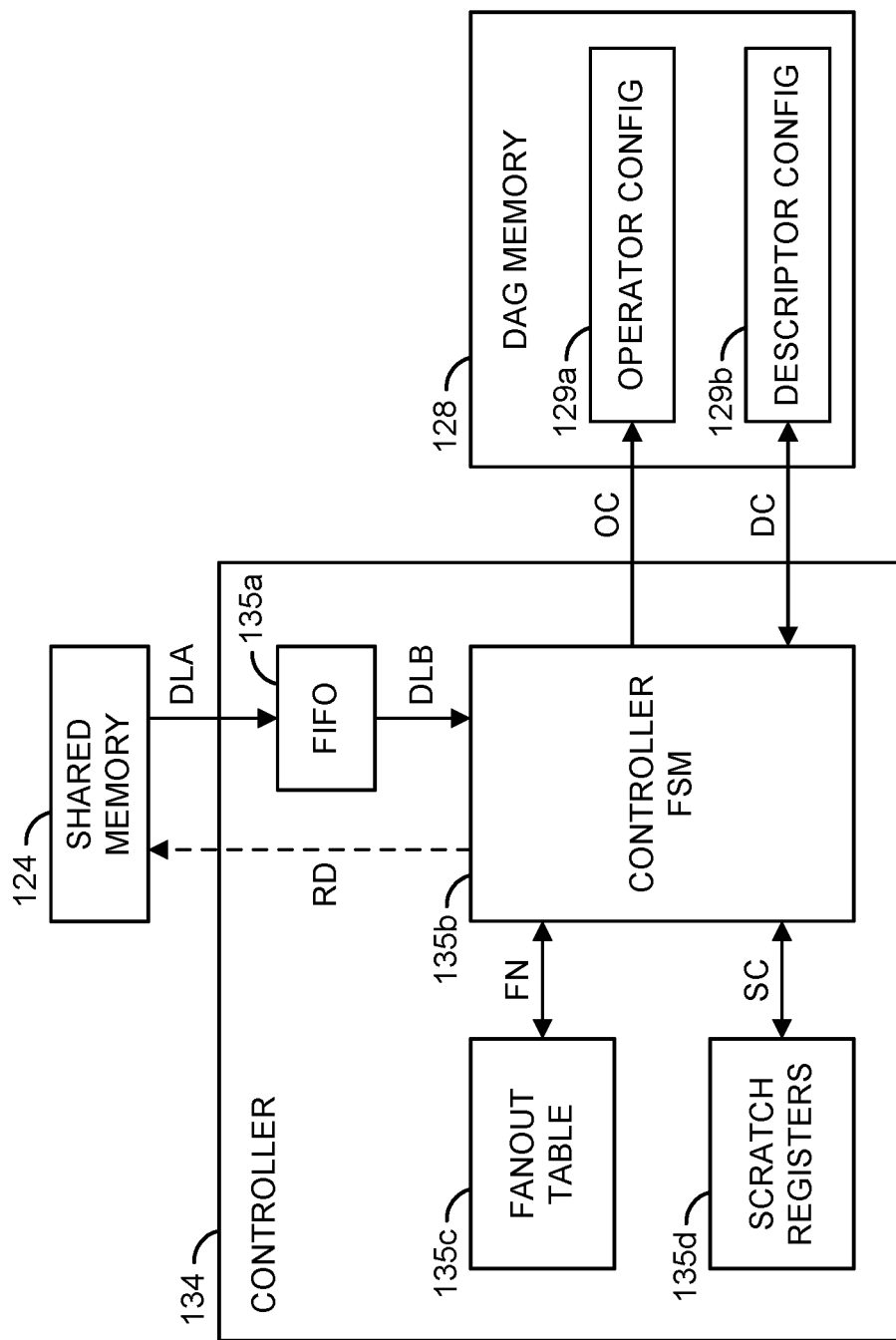
FIG. 4 is a diagram of circuitry for parsing a directed acyclic graph.

Referring to FIG. 4, a diagram of an example implementation of circuitry for parsing a directed acyclic graph is shown. The DAG memory 128 may be configured as a block (or buffer) 129a and a block (or buffer) 129b. The controller 134 generally comprises a block (or circuit) 135a, a block (or circuit) 135b, a block (or circuit) 135c and a block (or circuit) 135d.

A signal (e.g., DLA) may be generated by the shared memory 124 and transferred to the circuit 135a. The signal DLA may convey one or more directed acyclic graph lists to be buffered. A signal (e.g., DLB) may be generated by the circuit 135a and transferred to the circuit 135b. The signal DLB may convey the directed acyclic graph lists as buffered. A signal (e.g., RD) may be generated by the circuit 135b and transferred to the shared memory 124. The signal RD may carry read requests. A signal (e.g., OC) may be generated by the circuit 135b and received by the buffer 129a. The signal OC may carry operator configuration data. A signal (e.g., DC) may be exchanged between the circuit 135b and the buffer 129b. The signal DC may carry descriptor configuration data. A signal (e.g., FN) may be exchanged between the circuit 135b and the circuit 135c. The signal FN may convey fanout data. A signal (e.g., SC) may be exchanged between the circuit 135b and the circuit 135d. The signal SC may carry scratch pad type data.

The buffer 129a may store operator configuration data generated by the circuit 135b. The operator configuration data may be received in the signal OC.

The buffer 129b may store descriptor configuration data. The descriptor configuration data may be exchanged between the descriptor configuration buffer 129b and the circuit 135b via the signal DC.

The circuit 135a may implement a first-in-first-out (FIFO) circuit. The FIFO circuit 135a is generally operational to buffer the directed acyclic graph lists as received in the signal DLA. The buffered lists may be presented in the signal DLB to the circuit 135b. In various embodiments, the FIFO circuit 135a may store multiple (e.g., 64) words at a time. Other size FIFOs may be implemented to meet the design criteria of a particular application.

The circuit 135b may implement a controller finite state machine (FSM). The controller finite state machine 135b is generally operational to control the parsing of the binary representations of the directed acyclic graphs into the operators that may be allocated to the hardware engines 122a-

122n. The controller finite state machine 135b may also be operational to allocation the operators to the hardware engines 122a-122n.

The circuit 135c may implement a fanout table. The fanout table 135c is generally operational to store fanout data used by the controller finite state machine 135b to parse and allocate the operators. The fanout table 135c may communicate bidirectionally with the controller finite state machine 135b via the signal FN.

The circuit 135d may implement multiple scratch registers. The scratch registers 135d may be operational to store scratch pad type data generated and consumed by the controller FSM 135b. The scratch registers 135d may communicate bidirectionally with the controller finite state machine 135b via the signal SC.

The controller finite state machine 135b may request the linear directed acyclic graph list data in the signal RD. The directed acyclic graph list data may be transferred in the signal DLA in packets of multiple (e.g., 32) words at N-bits (e.g., 32-bits) per word from the shared memory 124 to the FIFO circuit 135a. The FIFO circuit 135a generally allows prefetching of the linear directed acyclic graph list data in coarse requests (e.g., an efficient use of memory bandwidth) while permitting processing of the data a single word at a time. Once a word is processed, the next word may be popped out of the FIFO circuit 135a and transferred to the controller finite state machine 135b via the signal DLB. In some embodiments, a capacity of the FIFO circuit 135a may hold multiple (e.g., 2) requests at a time. The prefetching and buffering generally hides a latency of the memory access to the shared memory 124.

Each binary representation of a directed acyclic graph list may be a sequence of operators or descriptors. The descriptors may be parsed by the controller finite state machine 135b and stored into the descriptor configuration buffer 129b. A fanout of the descriptors may be specified as {operator, port} pairs of operators that appear later in the directed acyclic graph lists. The fanout descriptor information may be stored in the fanout table 135c. At a later time, when the operators are parsed by the controller finite state machine 135b, the fanout table 135c may be accessed to determine the input connectivity of the operators. The fanout table 135c may hold only references to the descriptors previously parsed and stored into the descriptor configuration buffer 129b. To complete parsing of an operator, the descriptor information is generally read back from the descriptor configuration buffer 129b to be able to infer information such as vector sizes and operator data formats. Output connectivity generally appears directly in the directed acyclic graph lists after the operator words, so the output connectivity information may be readily available when an operator is being parsed. Once the descriptor information of the operands is determined, any missing information may be inferred by the controller finite state machine 135b. Sanity checks may subsequently be performed by the controller finite state machine 135b and the expanded operator configuration information, with full operand information (e.g., vector sizes, buffer IDs), may be stored in the operator configuration buffer 129a.

While parsing, the controller finite state machine 135b may use the scratch registers 135d to piece together the information read from the directed acyclic graph list data. Both the fanout table 135c and the scratch registers 135d may be non-persistent type storage: the data may be discarded after parsing of a directed acyclic graph is completed. The result of directed acyclic graph parsing may be stored solely in the DAG memory 128.

Figure 5:
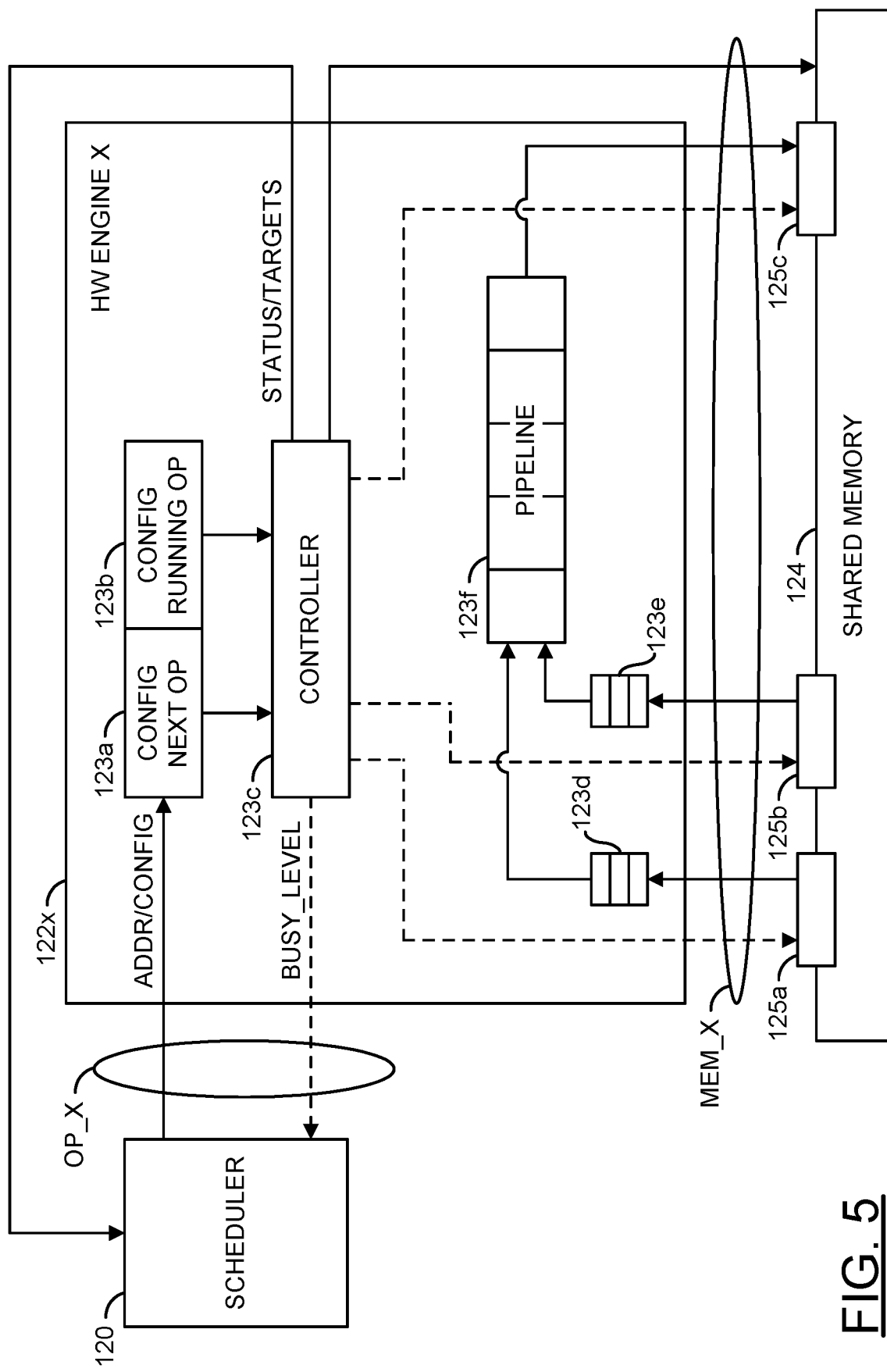
FIG. 5 is a diagram of a generic hardware engine.

Referring to FIG. 5, a diagram of an example implementation of a generic hardware engine 122x. The hardware engine 122x may be representative of the hardware engines 122a-122n. The hardware engine 122x generally comprises a block (or buffer) 123a, a block (or buffer) 123b, a block (or circuit) 123c, a block (or buffer) 123d, a block (or buffer) 123e and a block (or circuit) 123f. The shared memory 124 may be configured as multiple shared buffers 125a-125c.

A signal (e.g., ADDR/CONFIG) may be generated by the scheduler circuit 120 and received by the hardware engine 122x. The signal ADDR/CONFIG may carry address information and configuration data. A signal (e.g., BUSY_LEVEL) may be generated by the circuit 123c and transferred to the scheduler circuit 120. The signal BUSY_LEVEL may convey the busy level of the hardware engine 122x. A signal (e.g., STATUS/TARGETS) may be generated by the circuit 123c and transferred to the scheduler circuit 120. The signal STATUS/TARGETS may provide status information regarding the hardware engine 122x and target information for the operands.

The buffers 123a and 123b may implement a double-banked buffer. The double-banked buffer may be operational to store configuration information for a currently running operation (e.g., stored in the buffer 123b) while next operation information is being moved into the other buffer (e.g., 123a). Once the circuit 123c is finished with the running configuration information and the next configuration information has been received, the buffers 123a and 123b may swapped.

The circuit 123c may implement a controller circuit. The controller 123c is generally operational to control the movement of information into, out of, and internal to the hardware engine 122x.

The buffers 123d and 123e may implement FIFO buffers. The FIFO buffers 123d and 123e may be operational to store operands received from the shared buffers 125a and 125b. Although two FIFO buffers 123d and 123e, and two shared buffers 125a and 125b are shown, other numbers of FIFO buffers and shared buffers may be implemented to meet the design criteria of a particular application.

The circuit 123f may implement a pipeline circuit. The pipeline circuit 123f is generally operational to process the operands received from the FIFO buffers 123d and 123e using the functionality designed into the hardware engine 122x. The data resulting from the functions may be stored in the shared buffer 125c.

The scheduler circuit 120 generally loads the operator configuration information (including status words in case the operator has been partially processed in previous operator chunks) into the double-banked buffers 123a or 123b. The oldest operator in the configuration information may be the currently running operator in "running" side of the double-banked buffers 123a or 123b. New operator configuration information may be loaded into the "next" side of the double-banked buffers 123a or 123b.

The controller 123c of the hardware engine 122x generally determines when to switch from the old operator to the new operator. In some situations, the operations performed by the hardware engine 122x may be pipelined in the pipeline circuit 123f. During an operator switch, a front end of the pipeline circuit 123f may already be working on the new operator while a tail-end of the pipeline circuit 123f may still be finishing up the old operator.

Figure 6:
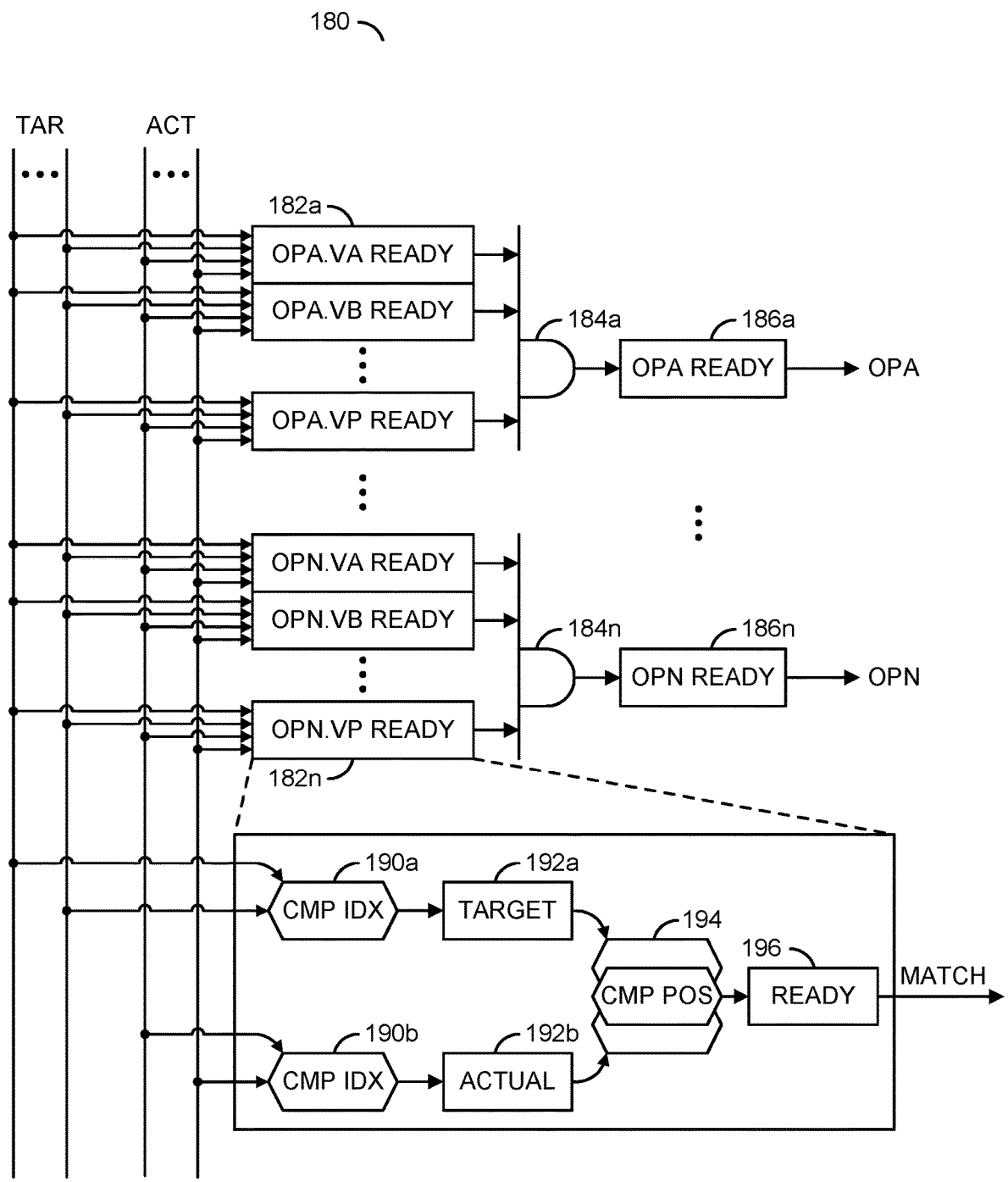
FIG. 6 is a diagram of readiness logic.

Referring to FIG. 6, a diagram of an example implementation of readiness logic 180 to track the target positions and the actual position in registers is shown. In various embodiments, the readiness logic 180 may be implemented in the operator readiness circuit 130. The readiness logic 180 generally comprises multiple blocks (or circuits) 182a-182n, multiple blocks (or circuits) 184a-184n and multiple blocks (or circuits) 186a-186n. Each circuit 182a-182n generally comprises multiple blocks (or circuits) 190a-190b, multiple blocks (or circuits) 192a-192b, a block (or circuit) 194 and a block (or circuit) 196.

Multiple components of a signal (e.g., TAR) may be received by each circuit 182a-182n. Each component of the signal TAR may carry a target position for a corresponding operand. Multiple components of a signal (e.g., ACT) may be received by each circuit 182a-182n. Each component of the signal ACT may carry an actual position for a corresponding operand. Each circuit 196 may generate a signal (e.g., MATCH). The signal MATCH generally conveys a status of each operand (e.g., the actual position matches or exceeds the target position, or not). The circuits 186a-186n may generate corresponding signals (e.g., OPA-OPN). Each signal OPA-OPN may convey a ready/not ready status of a corresponding operator.

The readiness of an operator may be derived as the logical AND of the readiness of all operands for the operator. Each circuit 182a-182n may implement a comparison circuit. Each circuit 182a-182n may compare the actual positions and the target positions of all operands of an operator and determine if the operands are ready or not ready. The ready/not ready results may be presented in the signals MATCH to a corresponding circuit 184a-184n.

Each circuit 184a-184n may implement a multi-input logical AND gate. Each circuit 184a-184n may be operational to logically AND the results in the corresponding signals MATCH for the corresponding operators, generally one circuit 182a-184n per operator. If all operands (e.g., vectors VA-VP) for a given operator (e.g., OPA) are ready, the corresponding logical AND gate (e.g., 184a) may indicate that the operator is ready for processing. Otherwise, the logical AND gate (e.g., 184a) may indicate that the operator is not ready for processing.

Each circuit 186a-186n may implement a status register. The status registers 186a-186n may be operational to buffer the ready/not ready state of a corresponding operator. The buffered states may be presented in the signals OPA-OPN. In some embodiments, the status registers 186a-186n may be part of the operator readiness circuit 130.

Each circuit 190a-190b may implement an index comparison circuit. The index comparison circuit 190a may be operational to compare the operator and a port index of the target position that is being broadcast in the signal TAR against that of the local operand to determined when to latch the broadcast target position into a local register (e.g., TARGET (OPi, Vj)), for all operators i and operands j. The index comparison circuit 190b may be operational to compare the operator and a port index of the actual position that is being broadcast in the signal ACT against that of the local operand to determined when to latch the broadcast actual position into a local register (e.g., ACTUAL (OPi, Vj)), for all operators i and operands j.

Each circuit 192a-192b may implement a register. The circuit 192a may store a corresponding target position in the register TARGET (OPi, Vj). The circuit 192b may store a corresponding actual position in the register ACTUAL (OPi, Vj).

The circuit 194 may implement a position comparison circuit. The position comparison circuit 194 is generally operational to compare the actual position buffered in the register 192b with the actual position in the register 192a. A result of the comparison may be presented to the circuit 196.

The circuit 196 may implement a status register. The status register 196 may buffer the ready/not ready state of a corresponding operator. The ready/not ready state may be presented in the signal MATCH to one of the logical AND gates 184a-184n. For relative positions the readiness logic 180 may perform a basic comparison of the positions. For absolute coordinates, more complex logic may be implemented since the resulting multidimensional comparison may take into account the dimensional order and potential tiling.

Figure 7:
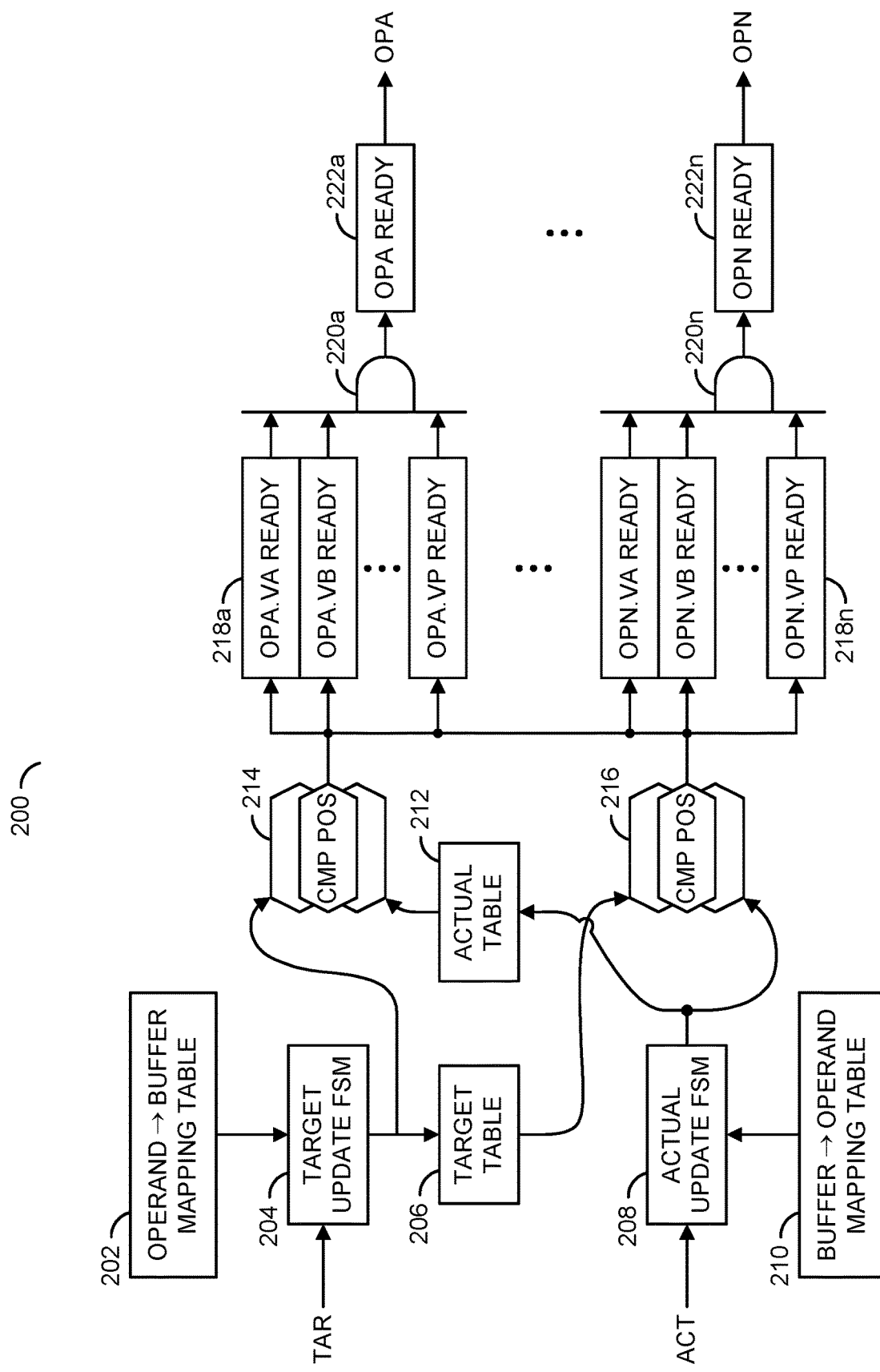
FIG. 7 is a diagram of other readiness logic.

Referring to FIG. 7, a diagram of an example implementation of readiness logic 200 is shown. The readiness logic 200 may be a variation of the readiness logic 180. The readiness logic 200 may be implemented in the operator readiness circuit 130. The readiness logic 200 generally comprises a block (or circuit) 202, a block (or circuit) 204, a block (or circuit) 206, a block (or circuit) 208, a block (or circuit) 210, a block (or circuit) 212, a block (or circuit) 214, a block (or circuit) 216, multiple blocks (or circuits) 218a-218n, multiple blocks (or circuit) 220a-220n and multiple blocks (or circuits) 222a-222n. The circuit 204 may receive the signal TAR. The circuit 208 may receive the signal ACT. The circuits 222a-222n may generate and present the signals OPA-OPN.

The circuit 202 may implement a mapping table. The mapping table 202 is generally operational to store mapping data that relates the positions of the operands to the buffers. The mapping data may be accessible by the circuit 204.

The circuit 204 may implement a target position update finite state machine (e.g., FSM). The target finite state machine 204 is generally operational to update the readiness of the operands each time the target position of an operand is modified. The updated readiness information may be presented to the circuit 206 and the circuit 214.

The circuit 206 may implement a target position table. The target position table 206 is generally operational to store the target positions of each operand. The operand positions may be presented to the circuit 216.

The circuit 208 may implement an actual position updated finite state machine. The actual finite state machine 208 is generally operational to update the readiness of the operands each time the actual position of an operand is modified. The updated readiness information may be presented to the circuit 212 and the circuit 216.

The circuit 210 may implement a mapping table. The mapping table 210 is generally operational to store mapping data that relates the positions of the buffers to the operands. The mapping data may be accessible by the actual finite state machine 208.

The circuit 212 may implement an actual position table. The actual position table 212 is generally operational to store the actual positions of each operand. The operand positions may be presented to the circuit 214.

The circuit 214 may implement a position comparison circuit. The position comparison circuit 214 may be operational to compare the actual positions of the operands, as received from the actual position table 212, with the updated target positions presented from the target finite state machine 204. Results of the comparison may be presented to the circuits 218a-218n.

The circuit 216 may implement a position comparison circuit. The position comparison circuit 216 may be operational to compare the updated actual positions of the operands, as generated by the actual finite state machine 208, with the target positions presented from the target position table 206. Results of the comparison may be presented to the circuits 218a-218n.

Each circuit 218a-218n may implement a status register. The status registers 218a-218n are generally operational to store the ready/not ready state of the operands, generally one register 218a-218n for each operand. The state of the operands may be presented to corresponding circuits 220a-220n in the signals MATCH. In various embodiments, the status registers 218a-218n may be part of the operator readiness circuit 130.

Each circuit 220a-220n may implement a multi-input logical AND gate. Each circuit 220a-220n may be operational to logically AND the results in the corresponding signal MATCH for a corresponding operator, generally one circuit 220a-220n per operator. If all operands (e.g., VA-VP) for a given operator (e.g., OPN) are ready, the corresponding logical AND gate (e.g., 220n) may indicate that the operator is ready for processing. Otherwise, the logical AND gate (e.g., 220n) may indicate that the operator is not ready for processing.

Each circuit 222a-222n may implement a status register. The status registers 222a-222n may be operational to buffer the ready/not ready state of the corresponding operators. The buffered states may be presented in the signals OPA-OPN. In some embodiments, the status registers 222a-222n may be part of the operator readiness circuit 130.

The actual positions and the target positions may be stored in the tables 206 and 212. The readiness logic 200 may only track the operand readiness in the small (e.g., single-bit) registers 218a-218n. Absolute actual positions may be stored per buffer instead of per operand, thereby providing additional savings, using the mapping table 210 to map the buffers to the operands and the mapping table 202 to map the operands to the buffers. Relative target positions and absolute target positions may be stored per operand because a buffer may have multiple fanout, and each consuming operator may have a different target position.

The finite state machines 204 and 208 may be operational to update the readiness of the operands each time the target position or the actual position of an operand is modified. For each modified actual position, the actual finite state machine 208 may update the actual position in the actual position table 212 as indexed by a buffer index, in case of absolute coordinate, or by an operand index, in case of relative position. In the case of absolute coordinate, the actual finite state machine 208 may look up relevant operands (e.g., multiple input operands in case of last write position or single output operand in case of free position) from the mapping table 210.

For each operand, the actual finite state machine 208 may get an operand-ready bit. If the operand-ready bit indicates ready, the actual finite state machine 208 may do nothing (e.g., skip to the next operand because the ready operand is guaranteed to stay ready). If the operand-ready bit indicates that the operand is not ready, the position comparison circuit 216 may look up the target position of the operand from the target position table 206 and determine operand readiness based on the actual position reported by the actual finite state machine 208 and the target position. If the position comparison circuit 216 determines that the operand is ready, the position comparison circuit 216 may set the operand-ready bit for each modified target position in the appropriate status register 218a-218n.

For each modified target position, the target finite state machine 204 may update the target position in the target position table 206. In the case of absolute coordinates, the target finite state machine 204 may look up the corresponding buffer index from the mapping table 202. The position comparison circuit 214 may look up the actual position of the operand (via the buffer index in case of absolute coordinate) from the actual position table 212. The position comparison circuit 214 may determine a readiness of the operand based on the actual position received from the actual position table 212 and the updated target position generated by the target finite state machine 204. Based on an outcome of the comparison, the position comparison circuit 214 may set or clear the operand-ready bit in the corresponding status registers 218a-218n.

Various embodiments may store the operand and/or the operator readiness in a table instead of in registers, and use additional finite state machines 204 and/or 208 to update the readiness of the operands and/or operators in the tables. In some embodiments, the finite state machines 204 and 208 may be combined in a single finite state machine. In other embodiments multiple (e.g., four) finite state machines may be implemented, one each for the absolute actual positions, relative actual positions, absolute target positions and relative target positions. Other numbers of finite state machines may be implemented to meet the design criteria of a particular application.

The scheduler circuit 120 generally keeps track of operators that are not yet completed. For each operator, the scheduler circuit 120 may know what hardware engines 122a-122n are compatible (e.g., capable of processing the operators). The scheduler circuit 120 may allocate operators to compatible hardware engines 122a-122n until all operators are completed. Only operators that are ready may be allocated based on the busy level of the compatible hardware engines 122a-122n. A priority mechanism may be included in the scheduler circuit 120 that realizes efficient directed acyclic graph execution (e.g., rather than an allocation in random order).

Figure 8:
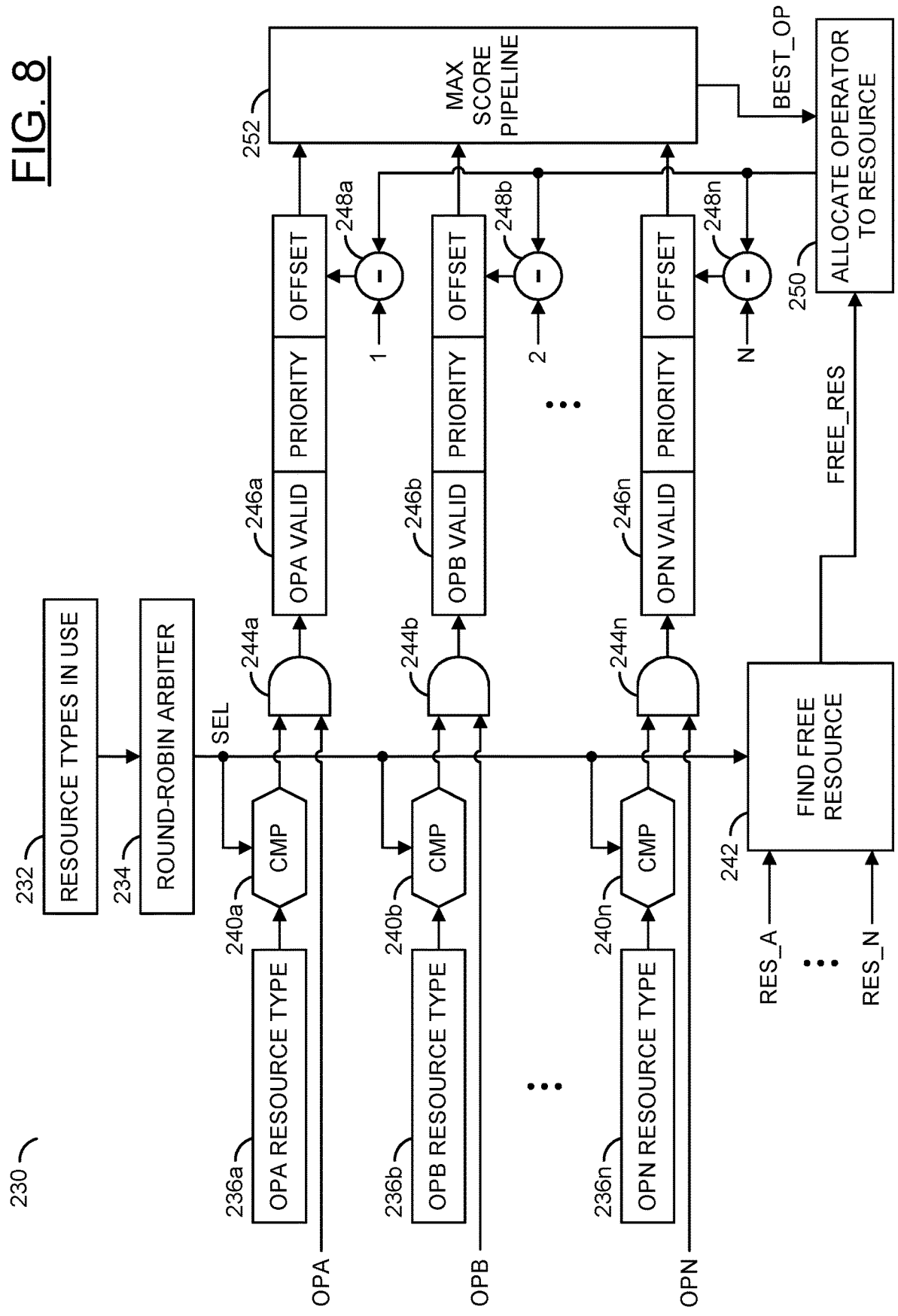
FIG. 8 is a diagram of allocation logic without preemption.

Referring to FIG. 8, a diagram of an example implementation of allocation logic 230 without preemption is shown. The allocation logic 230 may be implemented in the operator allocation circuit 132. The allocation logic 230 generally comprises a block (or circuit) 232, a block (or circuit) 234, multiple blocks (or circuits) 236a-236n, multiple blocks (or circuits) 240a-240n, a block (or circuit) 242, multiple blocks (or circuits) 244a-244n, multiple blocks (or circuits) 246a-246n, multiple blocks (or circuits) 248a-248n, a block (or circuit) 250 and a block (or circuit) 252. The allocation logic 230 may allocate operators on the hardware engines 122a-122n that are free (e.g., no preemption). Operators may also be allocated on hardware engines 122a-122n that are starved or near completion (e.g., busy_level=1). In a case of starvation, the preemption may be requested by the hardware engines 122a-122n, and so is not a preemption initiated by the scheduler circuit 120. In a case of an operator near completion, the hardware engines 122a-122n may intend to complete the old operator first, and so is not a true preemption but merely requesting the next operator to work on ahead of time.

The signals OPA-OPN (generated by the operator readiness circuit 130) may be received by the circuits 244a-244n, respectively. A signal (e.g., SEL) may be generated by the circuit 234 and presented to the circuits 240a-240n. The signal SEL may carry a selected winning resource type as determined by an arbitration process. Multiple signals (e.g., RES_A to RES_N) may be received by the circuit 242. The signals RES_A to RES_N may identify the ready/not ready status of the hardware engines 122a-122n, respectively. The circuit 242 may generate a signal (e.g., FREE_RES) received by the circuit 250. The signal FREE_RES may identify a free hardware engine 122a-122n selected for allocation of an operator. A signal (e.g., BEST_OP) may be generated by the circuit 252 and received by the circuit 250. The signal BEST_OP may identify a best operator to allocate to the selected free hardware engine 122a-122n.

The circuit 232 may implement a table of resource types (e.g., the hardware engines 122a-122n) currently in use. Data concerning the resource types in use may be presented to the circuit 234.

The circuit 234 may implement an arbiter circuit. The arbiter circuit 234 is generally operational to arbitrate among the resources in use to determine future allocations. In various embodiments, the arbiter circuit 234 may implement a round-robin style arbitration or a least recently used style arbitration. Other types of arbitration may be implemented to meet the design criteria of a particular application.

The circuits 236a-236n may implement type registers. The type registers 236a-236n may be operational to store resource type information that identifies one or more types of hardware resources suitable to process a corresponding operator. Each circuit 236a-236n may correspond to an operator. The resource type information may be presented to the circuit 240a-240n.

Each circuit 240a-240n may implement a comparison circuit. The circuits 240a-240n may be operational to compare the operator resource types stored in the type registers 236a-236n with the winning resource type in the signal SEL. Results (e.g., match/not match) may be presented to the corresponding circuits 244a-244n.

The circuit 242 may implement a finder circuit. The finder circuit 242 may be operational to find a free hardware engine 122a-122n that is both ready and matches the winning resource type. The ready/not ready status of the hardware engines 122a-122n may be received via the signals RES_A to RES_N. The winning resource type may be received in the signal SEL. A hardware engine 122a-122n, if any, that is free and of the winning type may be identified via the signal FREE_RES to the circuit 250. In case of a tie among multiple hardware engines 122a-122n of the winning type that are free or starved or near completion, the free hardware engine 122a-122n may be selected over hardware engines 122a-122n that are starved or near completion (based on the busy_level).

Each circuit 244a-244n may implement a two-input logical AND gate. The logical AND gates 244a-244n may be operational to logically AND the operator ready/not ready status in the signals OPA-OPN with the comparison results generated by the comparison circuits 240a-240n and store the results in fields (e.g., VALID) in the circuits 246a-246n. If an operator (e.g., OPA) is ready and the comparison circuit (e.g., 240a) indicates that the operator has the selected type, the corresponding logical AND gate (e.g., 244a) may set the valid field (e.g., OPA VALID in the circuit 246a) to true (e.g., a logical one or high value). If the operator is not ready and/or has a non-selected type, the corresponding logical AND gate (244a) may set the valid field (e.g., OPA VALID in the circuit 246a) to false (e.g., a logical zero of low value).

Each circuit 246a-246n may implement a condition register. The condition registers 246a-246n may be operational to store information regarding the readiness of the operators. Each condition register 246a-246n may include multiple (e.g., three) fields: the field VALID, a priority field (e.g., PRIORITY) and an offset field (e.g., OFFSET). The fields PRIORITY may contain static priority values assigned to the operators. The fields OFFSET may contain adjustable offset values, each offset value being a unique value. The data stored in the condition registers 246a-246n may be presented to the circuit 252.

Each circuit 248a-248n may implement a subtraction circuit. The subtraction circuits 248a-248n are generally operational to subtract a unique fixed value (e.g., 1, 2, 3, ... N) from a base value generated by the circuit 250. The resulting differences may be stored in the fields OFFSET of the condition registers 246a-246n. The unique fixed values generally ensure that each value in the N fields OFFSET are different from each other. In various embodiments, the base value may be a previous operator index value that was scheduled within a common priority group.

The circuit 250 may implement an allocation circuit. The allocation circuit 250 is generally operational to allocate a valid (and ready) operator with a highest score per the signal BEST_OP to the free hardware engine 122a-122n identified in the signal FREE_RES. The allocation circuit 250 may also be operational to generate the base offset used by the subtraction circuits 248a-248n.

The circuit 252 may implement a score pipeline circuit. The score pipeline circuit 252 is generally operational to find a valid operator having the best score and report that operator to the allocation circuit 250 in the signal BEST_OP. The operator scores may be based on the priority values stored in the fields PRIORITY. If two or more valid operators have the same priority values, the unique offset values may be used to establish a ranking of the valid operators. In some embodiments, the valid operator with the highest offset value among the valid operators with the same priority may be the best operator. In other embodiments, the valid operator with the lowest offset among the valid operators with the same priority may be the best operator.

The allocation scheme performed by the allocation logic 230 generally has the following properties. Only hardware engines 122a-122n that are idle or starved (e.g., busy_level<2) may be considered for scheduling. The value of the parameter busy_level may be used for tie-breaking with preference given to resources with lower busy_level values. Ready operators with higher priority may be scheduled first to improve efficiency. The operators may be grouped by the priority values. If a group of multiple operators with same priority value are ready and valid, the operators within the group may be allocated to the hardware resources in round-robin fashion or least recently used fashion to achieve fairness.

To implement the allocation scheme efficiently, the scheduler circuit 120 may track the following parameters for each operator in registers. Each parameter resource_type (e.g., stored in the type registers 236a-236n) may be a single index if the corresponding operator is only compatible with a single resource type, or a bitmap if the corresponding operator may be compatible with multiple resource types. The parameter priority (e.g., stored in the field PRIORITY of the condition registers 246a-246n) may specify a static value for each operator. The parameter offset (e.g., stored in the field OFFSET of the condition registers 246a-246n) generally determines a next operator within a priority group per the arbitration.

For a selected resource type, the comparison circuits 240a-240n may pass-filter the operators that are ready and compatible with that resource type currently selected by the arbiter circuit 234. The comparisons may yield a valid bit for each operator. The valid bit, the priority parameter and the offset parameter may be combined to construct a score of each operator. The scores are generally a function of the parameters, for example score={valid, priority, offset}.

The offset values may be the previous operator indexes that were scheduled within the same priority group minus the fixed values modulo the number of operators. The offset values may be calculated according to formula 1 as follows:

$$\text{Offset} = (\text{last\_operator\_index} - \text{operator\_index}) \bmod N \quad (1)$$

The operator with the highest score may be selected by the allocation circuit 250. If that operator is valid and a hardware resource of the selected resource type is not busy (e.g., busy_level<2), the winning operator may be scheduled on the hardware resource, and the offsets of all operators with matching priority may be updated.

The list of resource types in use for the current directed acyclic graph may be initialized at the beginning of the directed acyclic graph processing. In each allocation cycle, the arbiter circuit 234 may select a resource type. Based on the readiness of the operators and the resource type, the valid bit is derived for each operator. The valid bit may be combined with the priority and register fields to obtain scores. The score pipeline circuit 252 may determine the best operator and report the best operator in the signal BEST_OP. In parallel to the determination of the best operator, a free resource of the selected resource type may be chosen by the circuit 242. If both a free resource and a best valid operator are found, the best valid operator may be allocated to that free resource. The selected operator index value may broadcast to all fields OFFSET together with the priority values. For all operators of the same priority, the offset value in the fields OFFSET may be updated based on the new last operator index value.

Figure 9:
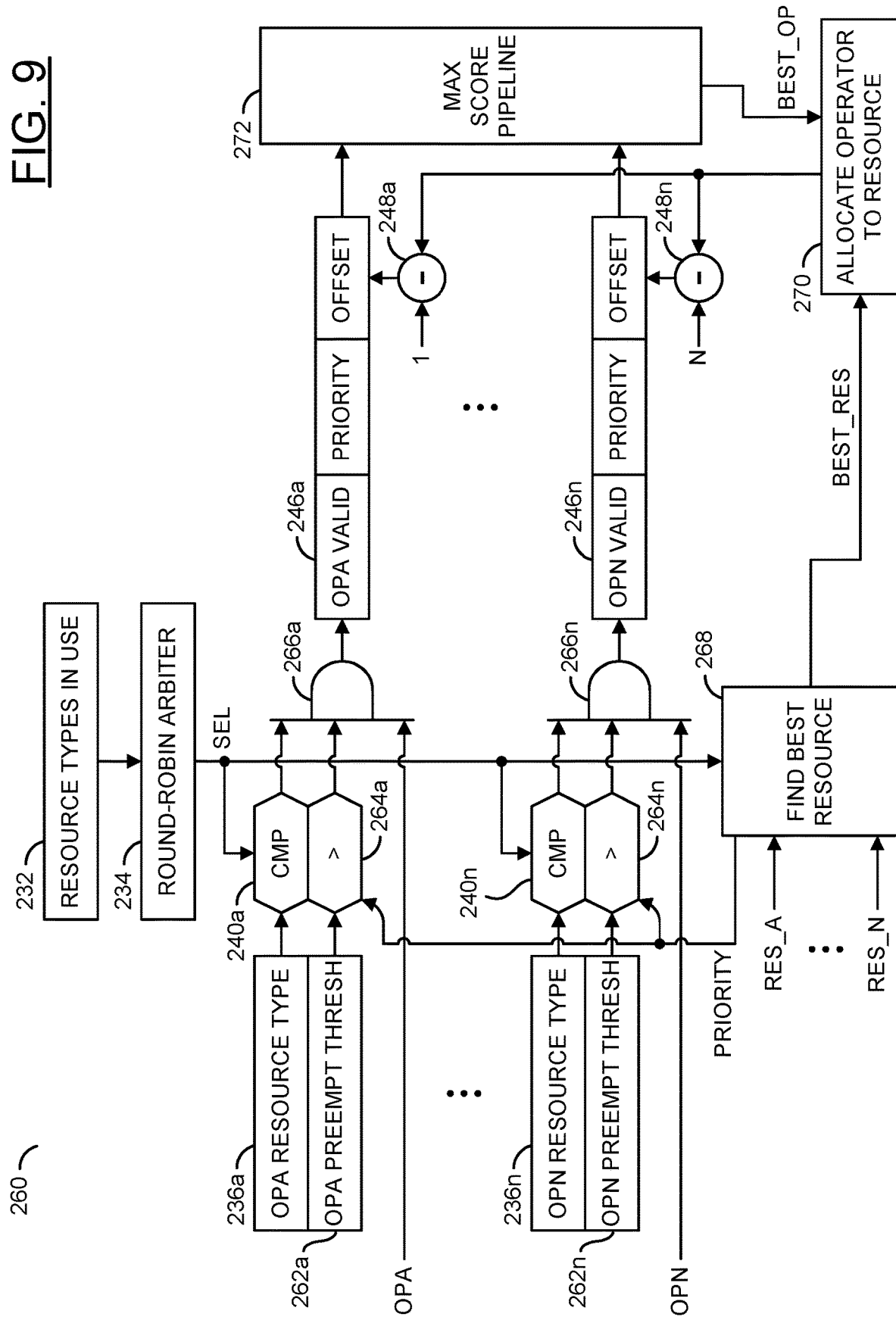
FIG. 9 is a diagram of allocation logic with preemption.

Referring to FIG. 9, a block diagram of an example implementation of allocation logic 260 with preemption is shown.

The allocation logic 260 may be a variation of the allocation logic 250 that allocate operators on the hardware engines 122a-122n and includes preemption allocations. The allocation logic may be implemented in the operator allocation circuit 132. The allocation logic 260 generally comprises the resource type table 232, the arbiter circuit 234, the type registers 236a-236n, the comparison circuits 240a-240n, the condition registers 246a-246n, the subtraction circuits 248a-248n the score pipeline circuit 252, multiple blocks (or circuits) 262a-262n, multiple blocks (or circuits) 264a-264n, multiple blocks (or circuits) 266a-266n, a block or circuit 268 and a block (or circuit) 270.

The signals OPA-OPN may be received by the circuits 266a-266n, respectively. The signals RES_A to RES_N may be received by the circuit 268. A signal (e.g., BEST_RES) may be generated by the circuit 268 and received by the circuit 270. The signal BEST_RES may identify a best hardware resource currently available. The signal BEST_OP may be generated by the circuit 252 and received by the circuit 270. A signal (e.g., PRIORITY) may be generated by the circuit 268 and transferred to the circuits 264a-264n. The signal PRIORITY may convey a current preemption priority value.

Each circuit 262a-262n may implement a preemption threshold register. The preemption threshold registers 262a-262n may be operational to store static preemption threshold values associated with the corresponding operators. The preemption threshold values may be presented to the circuits 264a-264n.

Each circuit 264a-264n may implement a logic circuit. The logic circuits 264a-264n are generally operational to compare the preemption thresholds values received from the preemption threshold registers 262a-262n with the current preemption priority value in the signal PRIORITY. For each preemption threshold value greater than the current preemption priority value, the corresponding logic circuits 264a-264n may present a true value to the corresponding circuits 266a-266n. Otherwise, the logic circuits 264a-264n may present a false value.

Each circuit 266a-266n may implement a three-input logical AND gate. The logical AND gates 266a-266n are generally operational to combine the resource type comparison results from the comparison circuits 240a-240n, the preemption threshold comparison results from the logic gates 264a-264n, and the ready/not ready results in the signals OPA-OPN. If the resource type matches the arbitration winning type, the preemption threshold value is greater than the current preemption priority value, and the operator is ready, the corresponding logical AND gate 266a-266n may set the respective fields VALID to true. Otherwise, the corresponding logical AND gates 266a-266n may set the respective fields VALID to false.

The circuit 268 may implement a best resource circuit. The best resource circuit 268 may be operational to identify a best hardware engine 122a-122n available to process the current arbitration winning operator type. The best hardware engine 122a-122n may be identified to the circuit 270 in the signal BEST_RES.

In some situations, the best hardware engine 122a-122n may currently be busy processing an operator.

The circuit 270 may implement an allocation circuit. The circuit 270 may be a variation on the allocation circuit 250. The allocation circuit 270 is generally operational to allocate a valid (and ready) operator with a highest score per the signal BEST_OP to the best hardware engine 122a-122n identified in the signal BEST_RES. The allocation circuit 270 may also be operational to generate the base offset value used by the subtraction circuits 248a-248n.

In the allocation scheme of the allocation logic 260, for a selected type, if a ready operator exists but no free hardware resources are available, the operator may or may not be allocated depending on the preemption threshold values. For a selected resource type, if all suitable hardware resources are occupied (e.g., busy_level 2), all suitable hardware resource with a busy level of 2 may be considered. Among the considered hardware resources with the busy level of 2, the one or more hardware resources processing the lowest priority operator or operators may be selected.

The operators may be further filtered by preemption level. Only the operators with a preemption threshold value strictly larger than the preemption priority value of the selected hardware resources may be considered for preemption. Among the considered subset of operators, the operator with the highest score may be selected and subsequently allocated to the best hardware resource in favor of the operator already being processed by the best hardware resource.

For each selected resource type, the best resource may be selected by finding the resource with the minimum resource score, where the resource score is a function of the parameters {busy_level, last_priority}. If the winner has a busy level=3, the hardware resource may be skipped.

The valid calculation for each operator may be extended with a comparison against the preemption threshold value. If the busy level is 0 or 1, the comparison may be forced to true (e.g., as if the last priority is forced to −1).

Figure 10:
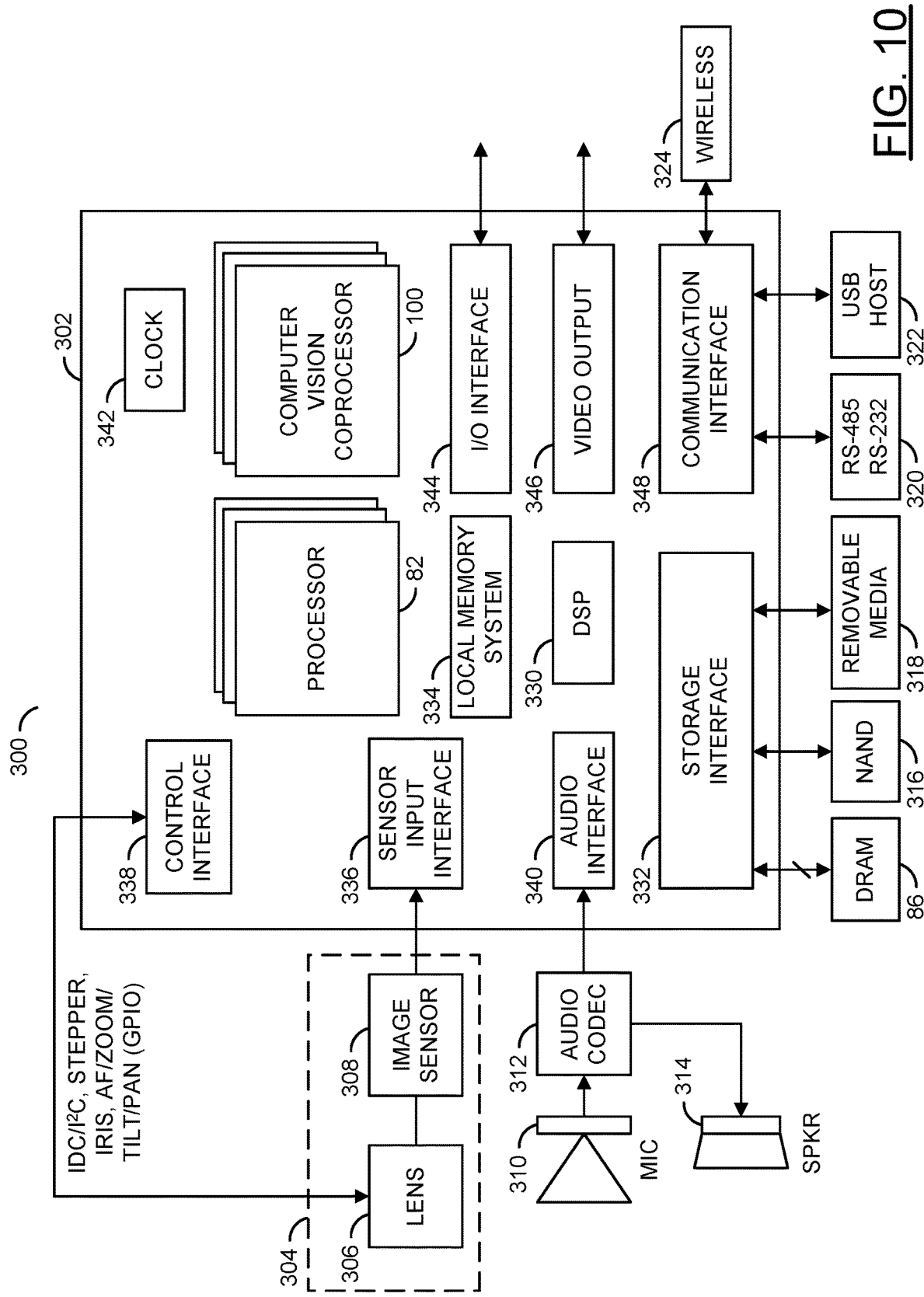
FIG. 10 is a diagram of a camera system.

Referring to FIG. 10, a diagram of a camera system 300 is shown illustrating an example implementation of a vector processing system in accordance with an embodiment of the present invention. In one example, the electronics of the camera system 300 may be implemented as one or more integrated circuits. For example, an application specific integrated circuit (ASIC) or system on chip (SOC) may be used to implement the camera system 300.

In one example, the camera system 300 may comprise the DRAM circuit 86, a processor/camera chip (or circuit) 302, a block (or assembly) 304 having a block 306 and one or more blocks (or circuits) 308, a block (or circuit) 310, a block (or circuit) 312, a block (or circuit) 314, a block (or circuit) 316, a block (or circuit) 318, a block (or circuit) 320, a block (or circuit) 322 and a block (or circuit) 324. The circuits 86 and 304-324 may be connectable to the camera circuit 302.

In various embodiments, the camera circuit 302 may comprise one or more processor circuits 82 (e.g., ARM, etc.), one or more coprocessor circuits 100, a block (or circuit) 330, a block (or circuit) 332, a block (or circuit) 334, a block (or circuit) 336, a block (or circuit) 338, a block (or circuit) 340, a block (or circuit) 342, a block (or circuit) 344, a block (or circuit) 346 and a block (or circuit) 348. The circuits 82 through 348 may be connected to each other using one or more buses, traces, protocols, etc.

The circuit 304 may implement a lens and sensor assembly. The lens and sensor assembly 304 is shown connected to the camera circuit 302. In some embodiments, the lens and sensor assembly 304 may be a component of the camera circuit 302 (e.g., a SoC component). In some embodiments, the lens and sensor assembly 304 may be a separate component from the camera circuit 302 (e.g., the lens and sensor assembly may be an interchangeable component compatible with the camera circuit 302). In some embodiments, the lens and sensor assembly 304 may be part of a separate camera connected to the processing portion of the circuit 302 (e.g., via a video cable, a high definition media interface (HDMI) cable, a universal serial bus (USB) cable, an Ethernet cable, or wireless link). The lens and sensor assembly 304 may comprise other components (not shown). The number, type and/or function of the components of the lens and sensor assembly 304 may be varied according to the design criteria of a particular application.

The block 306 may implement a lens 306. The lens 306 may capture and/or focus light input received from the environment near the camera 300. The lens 306 may capture and/or focus light for the circuit 308. The lens 306 may be implemented as an optical lens. The lens 306 may provide a zooming feature and/or a focusing feature. The lens and sensor assembly 304 may be implemented with additional circuitry (e.g., motors) to adjust a direction, zoom and/or aperture of the lens 306. The lens 306 may be directed, tilted, panned, zoomed and/or rotated to provide a targeted view of the environment near the camera 300.

The circuit 308 may implement an image sensor. The image sensor 308 may receive light from the lens 306. The image sensor 308 may be configured to transform the received focused light into digital data (e.g., bitstreams). In some embodiments, the image sensor 308 may perform an analog to digital conversion. For example, the image sensor 308 may perform a photoelectric conversion of the focused light received from the lens 306. The image sensor 308 may present the converted image data as a color filter array (CFA) formatted bitstream. The camera circuit 302 may transform the bitstream into video data, video files and/or video frames (e.g., human-legible content).

The circuit 310 may be a microphone for capturing audio. The circuit 312 may be an audio codec for recording audio in a particular format. The circuit 314 may be a speaker for playing audio.

The circuit 316 may implement a nonvolatile memory (e.g., NAND flash memory, NOR flash memory, etc.). The circuit 318 may implement a removable media 318 (e.g., secure digital media (SD), secure digital extended capacity media (SDXC), etc.). The circuit 320 may implement one or more serial communication channels 320 (e.g., RS-485, RS-232, etc.). The circuit 322 may implement one or more universal serial bus (USB) hosts 322 and/or USB interfaces. The circuit 324 may implement wireless interface for communicating with a user device (e.g., a smart phone, a computer, a tablet computing device, cloud resources, etc.). In various embodiments, the wireless interface 324 and/or the USB Host 322 may be configured for communicating with a camera controller wirelessly. In the embodiment shown, the circuits 304-324 are implemented as components external to the camera circuit 302. In some embodiments, the circuits 304-324 may be components on-board the camera circuit 302.

The circuit 330 may be a digital signal processing (DSP) module. In some embodiments, the circuit 330 may implement separate image DSP and video DSP modules. The DSP module 330 may be configured to process digital signals. The DSP module 330 may comprise an image digital signal processor (IDSP), a video digital signal processor DSP (VDSP) and/or an audio digital signal processor (ADSP). The DSP module 330 may be configured to receive information (e.g., pixel data values captured by the image sensor 308) from the circuit 336. The DSP module 330 may be configured to determine the pixel values (e.g., RGB, YUV, luminance, chrominance, etc.) from the information received from the sensor input 336. The DSP module 330 may be further configured to support or provide a sensor RGB to YUV raw image pipeline to improve image quality, bad pixel detection and correction, demosaicing, white balance, color and tone correction, gamma correction, adjustment of hue, saturation, brightness and contrast adjustment, chrominance and luminance noise filtering.

The circuit 332 may be a storage interface. The storage interface 332 may be configured to manage one or more types of storage and/or data access. In one example, the storage interface 332 may implement a direct memory access (DMA) engine and/or a graphics direct memory access (GDMA). In another example, the storage interface 332 may implement a secure digital (SD) card interface (e.g., to connect to the removable media 318).

The circuit 334 may implement a local memory system (e.g., cache, fast random access memory, etc.). In various embodiments, programming code (e.g., executable instructions for controlling various processors and encoders of the camera circuit 302) may be stored in one or more of the memories (e.g., the DRAM circuit 86, the NAND 316, etc.). When executed by the processor circuit 82, the programming code generally causes one or more components in the camera circuit 302 to configure video synchronization operations and start video frame processing operations. The resulting compressed video signal may be presented to the storage interface 332, the video output 346 and/or the communication module 348. The storage interface 332 may transfer program code and/or data between external media (e.g., the DRAM circuit 86, the NAND 316, the removable media 318, etc.) and the local (internal) memory system 334.

The circuit 336 may implement a sensor input (or interface). The sensor input 336 may be configured to send/receive data to/from the image sensor 308. In one example, the sensor input 336 may comprise an image sensor input interface. The sensor input 336 may be configured to transmit captured images (e.g., light data) from the image sensor 308 to the DSP module 330 and/or the processor circuits 82. The data received by the sensor input 336 may be used by the DSP 330 to determine a luminance (Y) and chrominance (U and V) values from the image sensor 308. The sensor input 336 may provide an interface to the lens and sensor assembly 304. The sensor input 336 may enable the camera circuit 302 to capture image data from the lens and sensor assembly 304.

The circuit 338 may implement one or more control interfaces including but not limited to an inter device communication (IDC) interface, an inter integrated circuit ($I^2C$) interface, a serial peripheral interface (SPI), and a pulse width modulation (PWM) interface. The control interface 338 may be configured to generate signals (e.g., IDC/I2C, STEPPER, IRIS, AF/ZOOM/TILT/PAN, etc.) for controlling the lens and sensor assembly 304. The signal IRIS may be configured to adjust an iris for the lens and sensor assembly 304. The control interface 338 may enable the camera circuit 302 to control the lens and sensor assembly 304.

The circuit 340 may implement an audio interface (e.g., an $I^2S$ interface, etc.). The audio interface 340 may be configured to send/receive audio data. In one example, the audio interface 340 may implement an audio inter-IC sound ($I^2S$) interface. The audio interface 340 may be configured to send/receive data in a format implemented by the audio codec 312. The circuit 342 may implement a clock circuit including but not limited to a real time clock (RTC), a watchdog timer (WDT), and/or one or more programmable timers.

The circuit 344 may implement an input/output (I/O) interface. The I/O interface 344 may be configured to send/receive data. The data sent/received by the I/O interface 344 may be miscellaneous information and/or control data. In one example, the I/O interface 344 may implement a general purpose input/output (GPIO) interface. In another example, the I/O interface 344 may implement an analog-to-digital converter (ADC) module and/or digital-to-analog converter (DAC) module. In yet another example, the I/O interface 344 may implement an infrared (IR) remote interface. In still another example, the I/O interface 344 may implement one or more synchronous data communications interfaces (IDC SPI/SSI).

The circuit 346 may be a video output module. The video output module 346 may be configured to send video data. For example, the camera 300 may be connected to an external device (e.g., a TV, a monitor, a laptop computer, a tablet computing device, etc.). The video output module 346 may implement a high-definition multimedia interface (HDMI), an LCD/TV/Parallel interface and/or a DisplayPort interface. The video data may be presented in one or more formats (e.g., PAL, NTSC, VGA, WVGA, QVGA, SD, HD, Ultra HD, 4K, etc.).

The circuit 348 may be a communication module. The communication module 348 may be configured to send/receive data. The data sent/received by the communication module 348 may be formatted according to a particular protocol (e.g., Bluetooth, USB, Wi-Fi, UART, etc.). In one example, the communication module 348 may implement a secure digital input output (SDIO) interface. The communication module 348 may include support for wireless communication by one or more wireless protocols such as Bluetooth®, ZigBee®, Institute of Electrical and Electronics Engineering (IEEE) 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX and/or SMS. The communication module 348 may also include support for communicating using one or more of the universal serial bus protocols (e.g., USB 1.0, 2.0, 3.0, etc.). The camera circuit 302 may also be configured to be powered via a USB connection. However, other communication and/or power interfaces may be implemented accordingly to meet the design criteria of a particular application.

The functions performed by the diagrams of FIGS. 1-10 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines, virtual machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application. The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   a processor configured to schedule one or more operators used to process a plurality of vectors based on one or more status signals indicating a readiness state of the one or more operators; and
   an operator readiness circuit configured to (i) compare a target position and an actual position of each operand associated with the one or more operators to determine a readiness state of each operand, (ii) update said readiness state of said operands using a plurality of state machines, and (iii) generate said one or more status signals indicating said readiness state of the one or more operators based on the readiness state of each operand associated with said one or more operators, wherein said operator readiness circuit comprises a first table configured to store said target positions of said operands and a second table configured to store said actual positions of said operands.

2. The apparatus according to claim 1, wherein said one or more operators are parsed from a directed acyclic graph defining a computer vision process.

3. The apparatus according to claim 1, wherein for each modified actual position said operator readiness circuit is further configured to update the actual position in a plurality of tables and, if said actual position is an absolute actual position, determine whether to update said readiness state of each relevant operand.

4. The apparatus according to claim 1, wherein (i) said actual position is at least one of (a) an absolute actual position and (b) a relative actual position and (ii) said target position is at least one of (a) an absolute target position and (b) a relative target position.

5. The apparatus according to claim 1, wherein (i) said target positions comprise corresponding buffer locations established in a shared memory circuit and (ii) said actual positions comprise current locations of said operands.

6. The apparatus according to claim 1, wherein said actual positions of one or more of said operands are reported to said processor by one or more hardware engines.

7. The apparatus according to claim 6, wherein said one or more hardware engines, said operator readiness circuit and said processor are part of a computer vision system.

8. The apparatus according to claim 1, wherein a given one of said operators is allocated to at least one of a plurality of hardware engines in response to said actual positions at least meeting said target positions of all of said operands associated with said given operator.

9. The apparatus according to claim 1, wherein said operator readiness circuit further comprises a first finite state machine configured to update said first table each time one or more target positions are modified and a second finite state machine configured to update said second table each time one or more actual positions are modified.

10. The apparatus according to claim 9, wherein said operator readiness circuit further comprises an operand to buffer lookup table and a buffer to operand lookup table (i) accessible to said finite state machines and (ii) used by said operator readiness circuit to store absolute actual positions on a per buffer basis instead of per operand.

11. The apparatus according to claim 1, wherein said operator readiness circuit and said processor are part of a digital camera.

12. A method for scheduling operators, comprising the steps of:
   utilizing an operator readiness circuit to (i) compare a target position and an actual position of each operand associated with one or more operators to determine a readiness state of each operand, (ii) update said readiness state of said operands using a plurality of state machines, and (iii) generate one or more status signals indicating a readiness state of the one or more operators based on the readiness state of each operand associated with the one or more operators, wherein a first table stored in memory is configured to store said target positions of said operands and a second table stored in memory is configured to store said actual positions of said operands;
   scheduling said one or more operators based on said one or more status signals indicating said readiness state of the one or more operators; and
   processing a plurality of vectors using said operators in at least one hardware engine.

13. The method according to claim 12, further comprising:
   for each modified actual position, updating the actual position in at least one table and, if said actual position is an absolute actual position, determining whether to update said readiness state of each relevant operand.

14. The method according to claim 12, wherein (i) said actual position is at least one of (a) an absolute actual position and (b) a relative actual position and (ii) said target position is at least one of (a) an absolute target position and (b) a relative target position.

15. The method according to claim 12, wherein a given one of said operators is allocated to the at least one hardware engine in response to said actual positions at least meeting said target positions of all of said operands associated with said given operator.

16. The method according to claim 12, further comprising the step of:
   tracking said actual positions of said operands on a per buffer basis using a buffer to operand mapping table and an operand to buffer mapping table.

17. The method according to claim 12, further comprising:
   utilizing a first finite state machine to update said first table storing said target positions each time one or more target positions are modified; and
   utilizing a second finite state machine to update said second table storing said actual positions each time one or more actual positions are modified.

18. The method according to claim 12, further comprising:

storing one or more of the readiness states of the operands and the readiness states of the one or more operators in respective tables; and utilizing one or more of a plurality of finite state machines to update one or more of the readiness states of the operands and the readiness states of the one or more operators in the respective tables.

\* \* \* \* \*

UNITED STATES PATENT AND TRADEMARK OFFICE
CERTIFICATE OF CORRECTION

PATENT NO. : 11,216,307 B1
APPLICATION NO. : 16/668157
DATED : January 4, 2022
INVENTOR(S) : Peter Verplaetse Page 1 of 1

It is certified that error appears in the above-identified patent and that said Letters Patent is hereby corrected as shown below:

On the Title Page

The Assignee should appear as follows:
Ambarella International LP
Santa Clara, CA (US)

Signed and Sealed this
Fifteenth Day of March, 2022

Drew Hirshfeld
*Performing the Functions and Duties of the
Under Secretary of Commerce for Intellectual Property and
Director of the United States Patent and Trademark Office*